US012590640B2

(12) United States Patent
Crosatti

(10) Patent No.: US 12,590,640 B2
(45) Date of Patent: Mar. 31, 2026

(54) FLOW REVERSING APPARATUS

(71) Applicant: Rivian IP Holdings, LLC, Irvine, CA (US)

(72) Inventor: Lorenzo Crosatti, Aliso Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 900 days.

(21) Appl. No.: 17/724,658

(22) Filed: Apr. 20, 2022

(65) Prior Publication Data

US 2023/0341060 A1 Oct. 26, 2023

(51) Int. Cl.
*F16K 11/074* (2006.01)
*H01M 10/613* (2014.01)
*H01M 10/625* (2014.01)
*H01M 10/63* (2014.01)
*H01M 10/6556* (2014.01)
*H01M 10/6568* (2014.01)

(52) U.S. Cl.
CPC ......... *F16K 11/074* (2013.01); *H01M 10/613* (2015.04); *H01M 10/625* (2015.04); *H01M 10/63* (2015.04); *H01M 10/6556* (2015.04); *H01M 10/6568* (2015.04); *H01M 2220/20* (2013.01)

(58) Field of Classification Search
CPC . F16K 11/074; H01M 10/613; H01M 10/625; H01M 10/63; H01M 10/6556; H01M 10/6568; H01M 2220/20; Y02E 60/10

USPC .......................................................... 165/172
See application file for complete search history.

(56) References Cited

U.S. PATENT DOCUMENTS

| 1,422,178 | A | * | 7/1922 | Cooley | F16K 11/0853 |
| | | | | | 251/297 |
| 5,167,254 | A | * | 12/1992 | Walter | F16K 11/0833 |
| | | | | | 137/862 |
| 6,102,068 | A | * | 8/2000 | Higdon | F16K 27/003 |
| | | | | | 137/341 |
| 11,156,300 | B2 | * | 10/2021 | Bunda | F16K 27/065 |
| 12,083,856 | B2 | * | 9/2024 | He | B60H 1/00485 |
| 2015/0101789 | A1 | * | 4/2015 | Enomoto | B60H 1/039 |
| | | | | | 236/35 |

(Continued)

FOREIGN PATENT DOCUMENTS

| CN | 113246688 | A | * | 8/2021 | ......... B60H 1/00571 |
| CN | 113464750 | A | * | 10/2021 | .............. F16L 47/32 |
| KR | 20220045324 | A | * | 4/2022 | ............. B60K 11/02 |

*Primary Examiner* — Len Tran
*Assistant Examiner* — Gustavo A Hincapie Serna
(74) *Attorney, Agent, or Firm* — Foley & Lardner LLP

(57) ABSTRACT

An apparatus to reverse the direction of fluid flow is provided. The apparatus can include a first channel and a second channel. The first channel and second channel can define a first position to provide a first fluid flow direction via the first channel and the second channel. The apparatus can include a third channel and a fourth channel. The third channel and the fourth channel can define a second position to provide a second fluid flow direction via the third channel and the fourth channel. The apparatus can be configured to actuate from the first position to the second position to reverse flow direction from the first fluid flow direction to the second fluid flow direction.

20 Claims, 16 Drawing Sheets

(56) References Cited

U.S. PATENT DOCUMENTS

| 2015/0267720 | A1* | 9/2015 | Huang | F15B 11/006 |
| | | | | 137/484.2 |
| 2015/0354716 | A1* | 12/2015 | Morein | F16K 11/0853 |
| | | | | 137/625.47 |
| 2017/0029288 | A1* | 2/2017 | Mehmi | F16K 31/122 |
| 2019/0160910 | A1* | 5/2019 | Mano | B60H 1/00885 |
| 2019/0226737 | A1* | 7/2019 | He | F25B 13/00 |
| 2019/0363411 | A1* | 11/2019 | Takeuchi | H01M 10/6552 |
| 2021/0070142 | A1* | 3/2021 | Huang | B60H 1/00907 |
| 2021/0207733 | A1* | 7/2021 | Murison | F16K 31/0627 |
| 2022/0034562 | A1* | 2/2022 | Makihara | F25B 25/005 |
| 2022/0085438 | A1* | 3/2022 | Li | H01M 10/6568 |
| 2022/0097475 | A1* | 3/2022 | Huang | B60H 1/00007 |
| 2022/0163132 | A1* | 5/2022 | Jeong | B60H 1/00921 |
| 2022/0316607 | A1* | 10/2022 | Surve | F16K 27/065 |
| 2022/0341350 | A1* | 10/2022 | Imiolczyk | F16K 5/0421 |
| 2023/0098030 | A1* | 3/2023 | Liu | F16K 11/14 |
| | | | | 251/129.01 |
| 2023/0141026 | A1* | 5/2023 | Hayase | F15B 11/126 |
| | | | | 137/861 |
| 2023/0407980 | A1* | 12/2023 | Wang | B60K 11/02 |
| 2024/0300300 | A1* | 9/2024 | Yuan | B60K 11/04 |
| 2025/0003508 | A1* | 1/2025 | Muto | F16K 27/045 |
| 2025/0012368 | A1* | 1/2025 | Yamazaki | F16K 11/24 |

* cited by examiner

110

115
115
115
115
115
115
115
115
115

Second Position 405

First Position 310

Second Position 405

Second Position 405

1400

1500

1505

Provide Valve

FLOW REVERSING APPARATUS

INTRODUCTION

Electric vehicles can require batteries for power. The distance the electric vehicle can travel can depend on characteristics of the batteries.

SUMMARY

The present disclosure is directed towards providing an apparatus that can be or can include a valve. The valve can reverse a flow direction of fluid in a thermal component, such as a thermal component, of an electric vehicle or another device in a heat transfer system. The thermal component can be part of a heat transfer system that also can include two submodules within a battery module. The battery module can experience temperatures fluctuations that result in the performance of the electric vehicle declining. Reversing the flow direction of fluid in the thermal component can help control the temperature of the battery module because it allows for specific portions of the submodules to experience heat transfer either before or after other portions of the submodules.

At least one aspect is directed to an apparatus. The apparatus can include a first channel and a second channel. The first channel and second channel can define a first position to provide a first fluid flow direction via the first channel and the second channel. The apparatus can include a third channel and a fourth channel. The third channel and the fourth channel can define a second position to provide a second fluid flow direction via the third channel and the fourth channel. The apparatus can be configured to actuate from the first position to the second position to reverse flow direction from the first fluid flow direction to the second fluid flow direction.

At least one aspect is directed to a system. The system can include a first submodule having a bottom surface and a second submodule having a top surface. The system can include thermal component positioned between the top surface of the second submodule and the bottom surface of the first submodule. The thermal component can include a cooling line. The thermal component can define a first opening and a second opening. The first opening and the second opening can be connected by the cooling line. The system can include a valve. The valve can be configured to actuate from a first position to a second position. The valve can include a first ingress channel in communication with the first opening of the thermal component with the valve in the first position. The valve can include a first egress channel in communication with the second opening of the thermal component with the valve in the first position. The valve can include a second ingress channel in communication with the second opening of the thermal component with the valve in the second position. The valve can include a second egress channel in communication with the first opening of the thermal component with the valve in the second position.

At least one aspect is directed to an electric vehicle. The electric vehicle can include a battery pack. The battery pack can include a first submodule having a bottom surface and a second submodule having a top surface. The battery pack can include a thermal component positioned between the top surface of the second submodule and the bottom surface of the first submodule. The thermal component can include a cooling line. The thermal component can define a first opening and a second opening. The first opening and the second opening can be connected by the cooling line. The electric vehicle can include a valve. The valve can be configured to communicate with the thermal component. The valve can include a first channel and a second channel. The first channel and the second channel can define a first position to provide a first fluid flow direction. The valve can include a third channel and a fourth channel. The third channel and the fourth channel can define a second position to provide a second fluid flow direction. The valve can be configured to actuate from the first position to the second position to reverse flow direction from the first fluid flow direction to the second fluid flow direction.

At least one aspect is directed to a method. The method can include providing a valve. The valve can include a first channel and a second channel. The first channel and second channel can define a first position to provide a first fluid flow direction via the first channel and the second channel. The valve can include a third channel and a fourth channel. The third channel and the fourth channel can define a second position to provide a second fluid flow direction via the third channel and the fourth channel. The method can include actuating the valve from the first position to the second position to reverse flow direction from the first fluid flow direction to the second fluid flow direction.

At least one aspect is directed to a method. The method can include providing a first submodule. The first submodule can include a bottom surface. The method can include providing a second submodule. The second submodule can include a top surface. The method can include positioning a thermal component between the top surface of the second submodule and the bottom surface of the first submodule. The thermal component can include a cooling line. The thermal component can define a first opening and a second opening. The first opening and the second opening can be connected by the cooling line. The method can include positioning a valve upstream of the thermal component. The valve can be configured to actuate from a first position to a second position. The valve can include a first ingress channel in communication with the first opening of the thermal component with the valve in the first position. The valve can include a first egress channel in communication with the second opening of the thermal component with the valve in the first position. The valve can include a second ingress channel in communication with the first opening of the thermal component with the valve in the second position. The valve can include a second egress channel in communication with the second opening of the thermal component with the valve in the second position.

At least one aspect is directed to a method. The method can include providing a valve. The valve can include a first channel and a second channel. The first channel and second channel can define a first position to provide a first fluid flow direction. The valve can include a third channel and a fourth channel. The third channel and the fourth channel can define a second position to provide a second fluid flow direction. The valve can be configured to actuate from the first position to the second position to reverse flow direction from the first fluid flow direction to the second fluid flow direction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
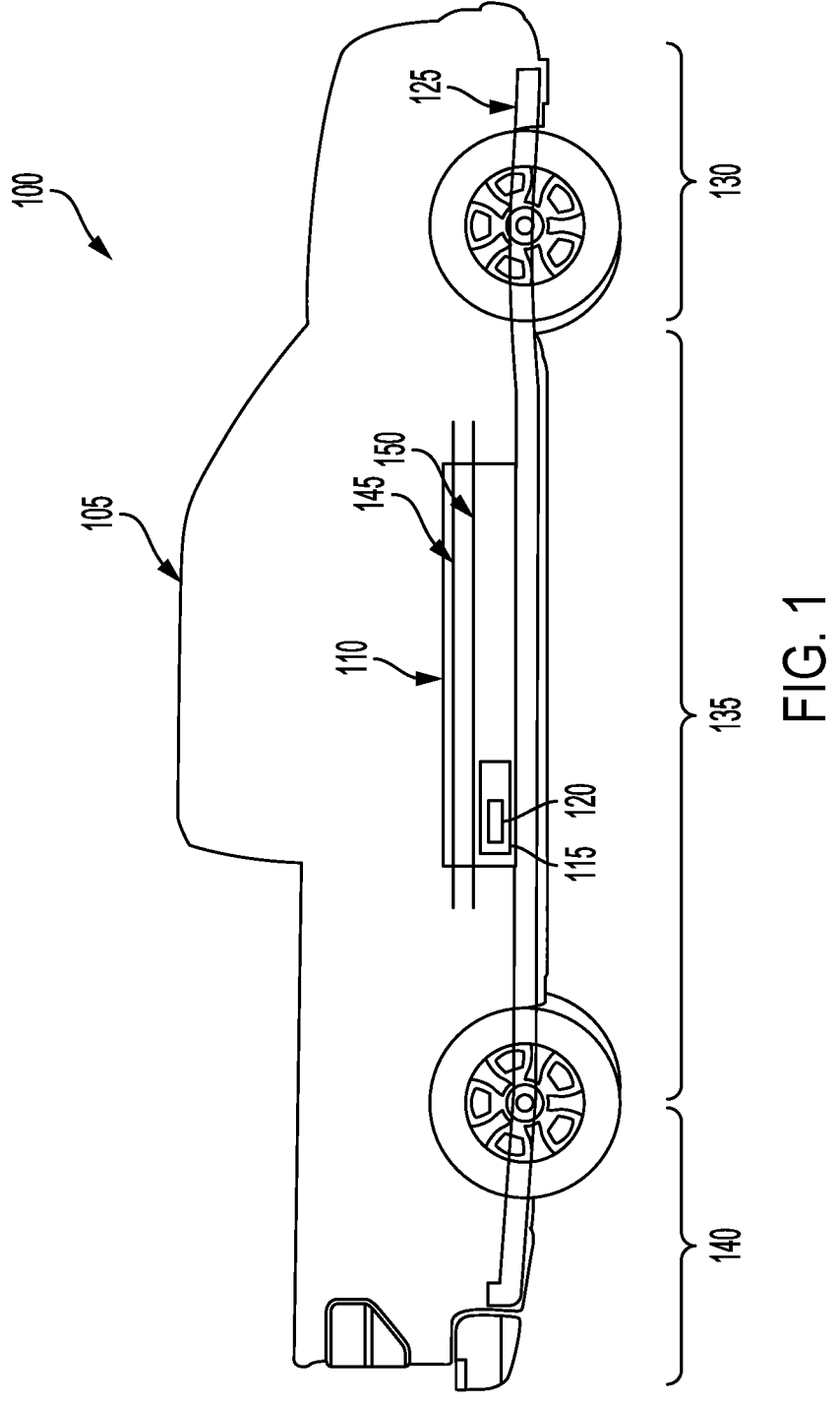
FIG. 1 depicts a side view of an electric vehicle, according to an exemplary embodiment.

Following below are more detailed descriptions of various concepts related to, and implementations of, methods, apparatuses, and systems of the apparatus. The various concepts introduced above and discussed in greater detail below may be implemented in any of numerous ways.

The present disclosure is directed to an apparatus that can reverse the fluid flow direction in a thermal component of a battery module of an electric vehicle. The temperature of battery modules can fluctuate such that its optimum performance is hindered. For example, battery modules that experience temperature fluctuations outside of threshold values can expire before battery modules that do not experience these temperature fluctuations. Hindering the performance of the battery module can in turn hinder the performance of the electric vehicle. For example, the range of the electric vehicle can be reduced as a result of temperature fluctuations of the battery modules over time.

The temperature of battery modules can fluctuate such that the overall average temperature of the battery module can be either too low or too high for optimum performance of the battery module and electric vehicle. Additionally, the temperatures of numerous battery cells within submodules that make up the battery module can fluctuate such that the overall internal temperature of the battery module is not uniform. For example, one portion of the battery module can be hotter or colder than another portion of the same battery module. This fluctuation of temperature within the battery module can hinder optimum performance of the battery module and electric vehicle. Thus, there is a need to control the temperature of the battery module in order to maximize performance of the electric vehicle and battery life.

Systems and methods of the present technical solution can provide an apparatus to reverse the fluid flow within a thermal component. The thermal component can be present for heat transfer purposes, such as to regulate the temperature of battery modules. The thermal component can include at least one channel that can have fluid flowing through it. The fluid flowing through the channel of the thermal component can facilitate heat transfer. For example, the fluid in the channel of the thermal component can be hotter than the temperature of the submodules within the battery module and can transfer heat to the submodules. Conversely, the fluid in the channel of the thermal component can be colder than the temperature of the submodules within the battery module and can expel heat from the submodules. Optimizing this heat exchange can be a challenge.

The disclosed solutions have a technical advantage of optimizing the heat exchange by reversing the direction of fluid flow in the channel of the thermal component in a controlled manner. For example, the apparatus allows for either hotter or colder fluid to reach certain portions of the battery module at certain times. Controlling the heat exchange in this manner can create more temperature uniformity across battery modules and can help provide more effective heat transfer, both of which can optimize the performance and life of the battery modules and the electric vehicle.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
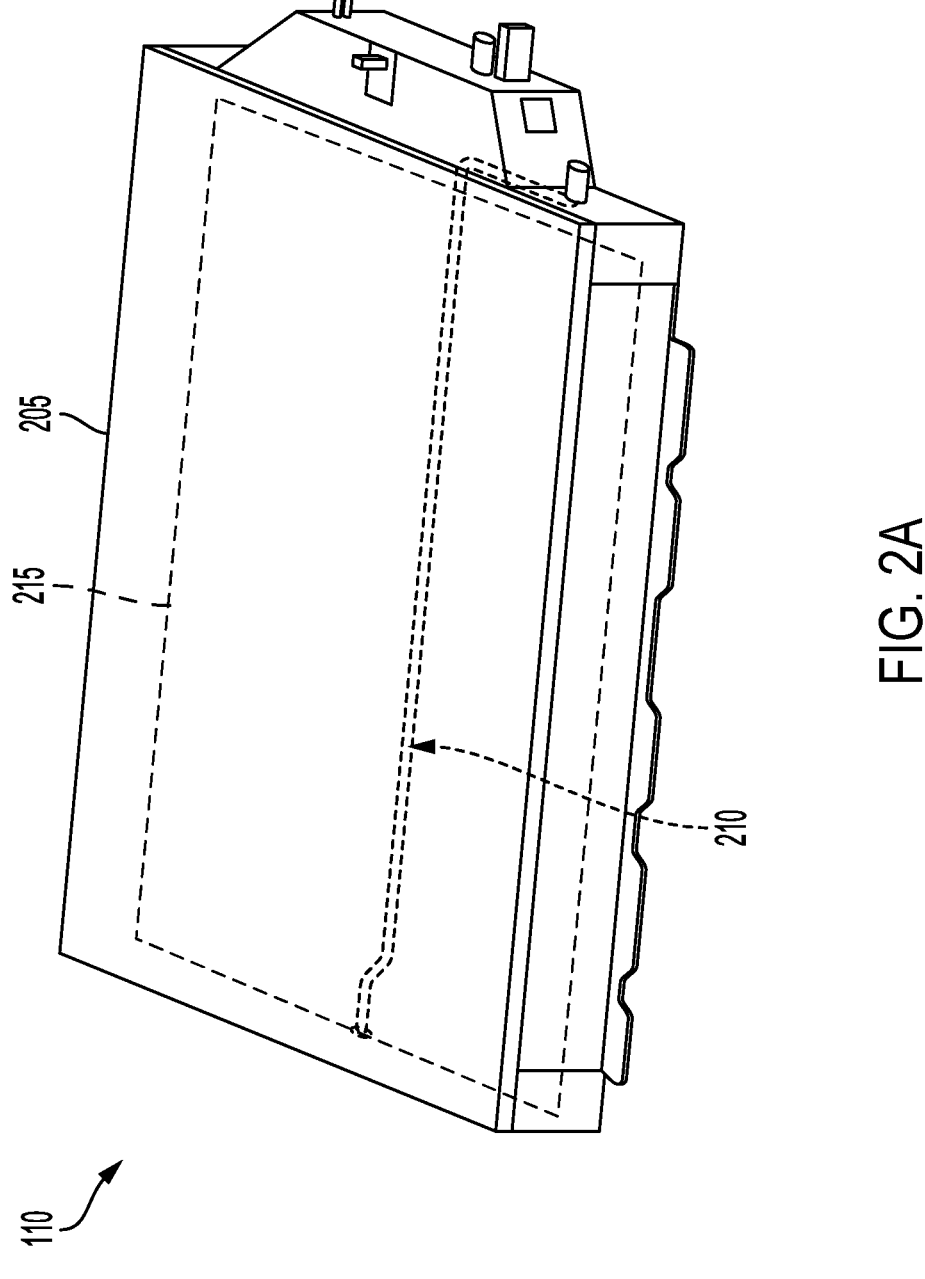
FIG. 2A depicts a perspective view of a battery pack, according to an exemplary embodiment.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component 215. For example, the thermal component 215 can be a cold plate, cold cross member, and/or bus bar. In some instances, the thermal component 215 may be positioned in relation to a top submodule and a bottom submodule, such as in between the top and bottom submodules, among other possibilities. The battery pack 110 can include any number of thermal components 215. For example, there can be one or more thermal components 110 per battery pack, or per battery module 115. The cooling line 210 can be coupled with, part of, or independent from the thermal component 215.

Figure 2B:
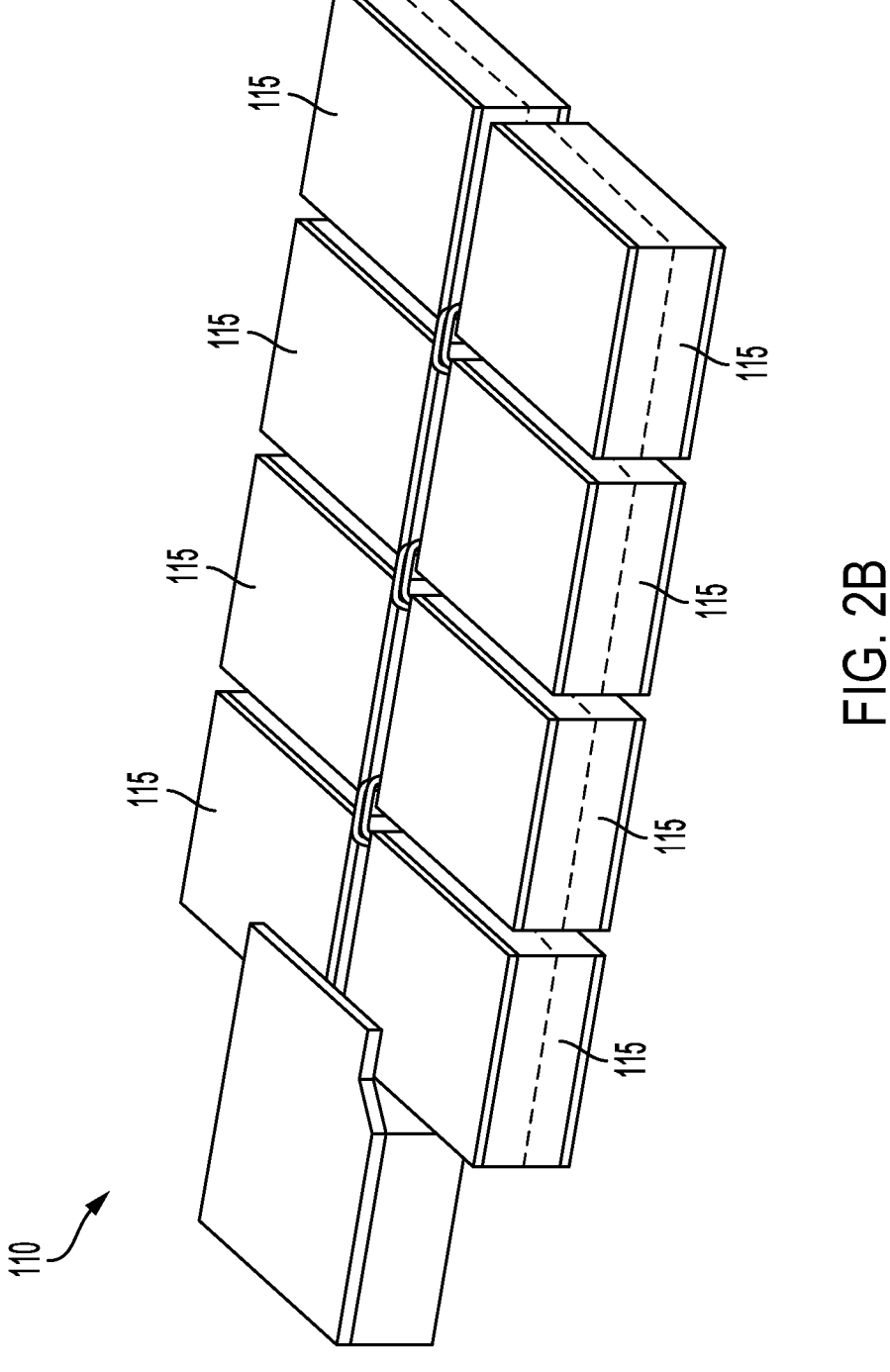
FIG. 2B depicts a perspective view of a battery module, according to an exemplary embodiment.

FIG. 2B depicts example battery modules 115. The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each batter module 115 may include a top submodule and a bottom submodule, possibly with a thermal component 215 in between the top submodule and the bottom submodule. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing. The electrolyte material, e.g., an ionically conductive fluid or other material, can generate or provide electric power for the battery cell 120. A first portion of the electrolyte material can have a first polarity, and a second portion of the electrolyte material can have a second polarity. The housing can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal (e.g., a positive or anode terminal) and a second polarity terminal (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing can be disposed in the battery module 115, the battery pack 110, or a battery array installed in the electric vehicle 105. The battery cell housing can be of any shape, such as cylindrical with a circular (e.g., as depicted), elliptical, or ovular base, among others. The shape of the battery cell housing can also be prismatic with a polygonal base, such as a triangle, a square, a rectangle, a pentagon, and a hexagon, among others.

Figure 3:
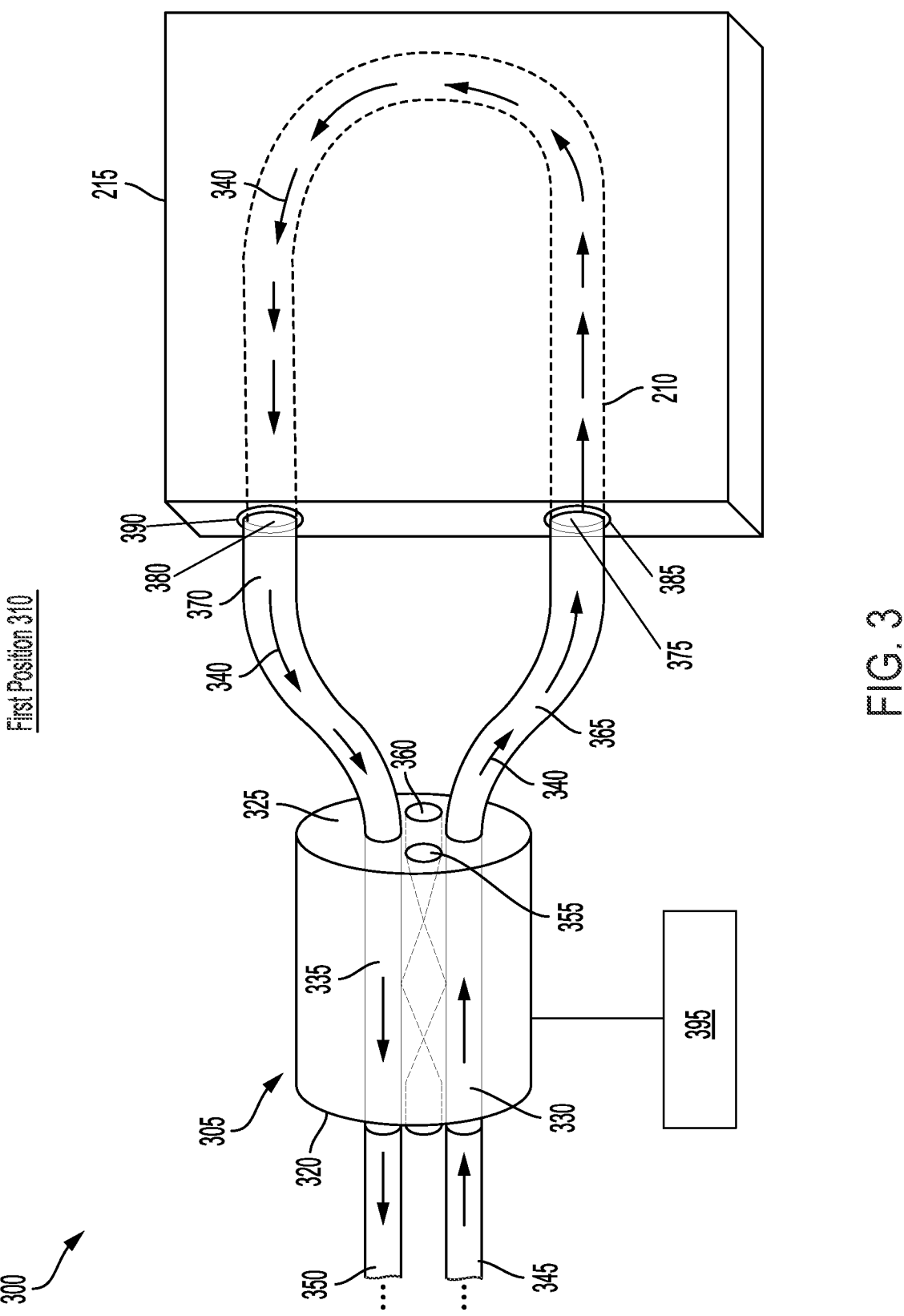
FIG. 3 depicts a perspective view of an apparatus in a first position, according to an exemplary embodiment.
Figure 4:
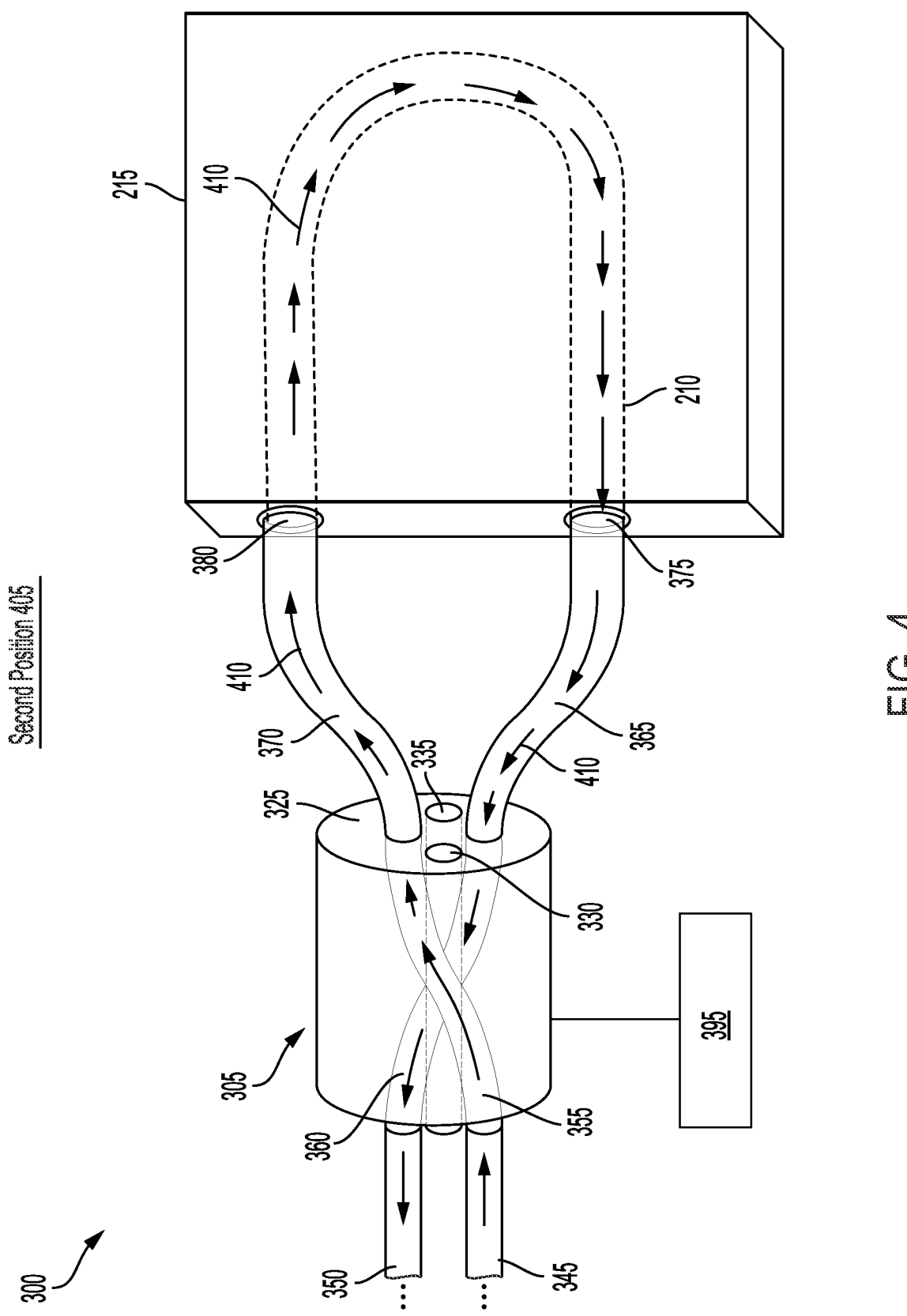
FIG. 4 depicts a perspective view of an apparatus in a second position, according to an exemplary embodiment.

FIG. 3 and FIG. 4 depict an example system 300. The system 300 can include at least one apparatus 305. For example, the apparatus can be or can include at least one valve. For example, the apparatus can be or can include at least one barrel. The apparatus 305 can be positioned between an at least one heat exchanger and the thermal component 215. The system 300 can include at least one actuator 395. For example, the actuator 395 can a mechanical device, electro-mechanical device, electrically powered, or hydraulically powered. For example, the actuator 395 can be a stepper motor. The actuator 395 can rotate the apparatus 305. For example, the actuator 395 can rotate the apparatus 305 clockwise or counter-clockwise at least 5 degrees. For example, the actuator 395 can rotate the apparatus 305 between 85 degrees and 95 degrees. For example, the actuator 395 can rotate the apparatus 305 90 degrees. The actuator 395 can change a state of operation of the apparatus 305. For example, the actuator 395 can rotate the apparatus 305 clockwise by 90 degrees and the apparatus 305 can change from at least one first position 310 to at least one second position 405, as discussed in more detail below. The actuator 395 can rotate the apparatus 305 at an at least one threshold temperature of at least one component of the electric vehicle 105. For example, the valve can actuate from the second position 405 to the first position 310 or from the first position 310 to the second position 405 at different threshold temperatures of the battery module 115. The threshold temperature can be a predetermined temperature. For example, the threshold temperature can be based off temperature boundaries of the components of the electric vehicle 105. For example, the temperature boundaries can be for the battery pack 110, the battery module 115, or the battery cells 120. The temperature boundaries can range from 0 degrees Celsius to 60 degrees Celsius. For example, the temperature boundaries can range from 20 degrees Celsius to 60 degrees Celsius. For example, the threshold temperature can be based off the temperature boundary of the battery module 115 and be 55 degrees Celsius such that the valve can actuate from the second position 405 to the first position 310.

The apparatus 305 can be in the shape of a cylinder, a cube, a sphere, or a pyramid. The apparatus 305 can have at least one first face 320 and at least one second face 325. For example, the first face 320 and the second face 325 can be flat surfaces. The first face 320 and the second face 325 can include openings for different channels, as discussed in more detail below. The apparatus 305 can be made of metal. For example, the apparatus 305 can be made of steel, bronze, or brass. The apparatus 305 can be made of plastic. For example, the apparatus 305 can be made of polyvinyl chloride (PVC), chlorinated polyvinyl chloride (CPVC), polypropylene (PP), or polyvinylidene fluoride (PVDF). The apparatus 305 can be made of a combination of metal and plastic. For example, a portion of the apparatus 305 can be made of polyvinyl chloride (PVC) and another portion of the apparatus 305 can be made of brass.

The apparatus 305 can include at least one channel. For example, the apparatus 305 can include a first channel 330. The first channel 330 can be or include a first ingress channel. The first channel 330 can be straight, curved, or can include combinations of straight and curved portions. The first channel 330 can extend through the apparatus 305. For example, the first face 320 and the second face 325 can each include at least one opening. An opening on the second face 325 can be connected to an opening on the first face 320 via the first channel 330. The first channel 330 can have fluid flow through it. For example, the fluid can be a coolant or a heated fluid. The first channel 330 can be coupled with at least one first opening 375 of the thermal component 215 via a connector. The first channel 330 can provide fluid to the first opening 375 of the thermal component 215. For example, the first channel 330 can provide coolant to the first opening 375 such that the coolant flows through the thermal component 215, as discussed more below.

The apparatus 305 can include a second channel 335. For example, the second channel 335 can be or include a first egress channel. The second channel 335 can be straight, curved, or can include both straight and curved portions. The second channel 335 can extend through the apparatus 305. For example, the first face 320 and the second face 325 can each include at least one opening. An opening on the second face 325 can be connected to an opening on the first face 320 via the second channel 335. The second channel 335 can have fluid flow through it. For example, the fluid can be a coolant or a heated fluid. The second channel 335 can be coupled with at least one second opening 380 of the thermal component 215 via a connector. The second channel 335 can receive fluid from the second opening 380 of the thermal component 215. For example, the second channel 335 can receive coolant from the thermal component 215 via the second opening 380, as discussed more below.

The couplings described herein, such as the coupling between the second channel 335 and the second opening 380, can be permanent couplings, temporary couplings, reversible couplings, detachable couplings, or a combination thereof. For example, the couplings can be a jaw-type, snap-fit, disk, weld, clamp, or a socket.

The first channel 330 and second channel 335 can define the first position 310 of the apparatus 305. For example, the first position 310 can provide at least one first fluid flow direction 340 via the first channel 330 and the second channel 335. Fluid can travel in the first fluid flow direction 340 from the first channel 330 to and through the thermal component 215 and then through the second channel 335 from the thermal component 215.

The first channel 330 and second channel 335 do not have to define a position of the apparatus 305. For example, the apparatus 305 can be a barrel. The barrel can comprise a first channel 330 and a second channel 335. The barrel can be configured to transfer fluid in one direction via the first channel 330. The barrel can be configured to rotate. For example, the barrel can be configured to rotate such that the rotation causes a reversal of the fluid transfer. For example, the rotation can cause the fluid to transfer in an opposite direction via the second channel 335.

The system 300 can include at least one supply tube 345. For example, the supply tube 345 can provide the fluid to the first channel 330. The supply tube 345 can be coupled with at least one other component of the electric vehicle 105. For example, the supply tube 345 can be coupled with at least one fluid supply. The supply tube 345 can be coupled with at least one pump that is in fluid communication with the heat exchanger. The heat exchanger can provide fluid to the first channel 330. For example, the heat exchanger can provide coolant to the first channel 330 via the supply tube 345. The supply tube 345 and the first channel 330 can be coupled. For example, when the actuator 395 rotates the apparatus 305, the first channel 330 can be detached, or decoupled, from the supply tube 345. The supply tube 345 can be made of a flexible material, such as PVC tubing, or a hard material, such as steel.

The system 300 can include at least one receiver tube 350. For example, the receiver tube 350 can receive fluid from the second channel 335. The receiver tube 350 can be coupled with at least one other component of the electric vehicle 105. For example, the receiver tube 350 can be coupled with at least one subsystem of the electric vehicle 105 that needs to be thermally controlled. The receiver tube 350 and the second channel 335 can be coupled. For example, when the actuator 395 rotates the apparatus 305, the second channel 335 can be detached, or decoupled, from the receiver tube 350. The receiver tube 350 can be made of a flexible material, such as PVC tubing, or a hard material, such as steel.

The apparatus 305 can include a third channel 355 and a fourth channel 360. For example, the third channel 355 can be a second ingress channel. Additionally, the fourth channel 360 can be or can include a second egress channel. The third channel 355 and the fourth channel 360 can be straight, curved, or can include combinations of straight and curved portions be curved. For example, the third channel 355 and the fourth channel 360 can each have at least one curve such that the channels curve around each other. One of the third channel 355 and the fourth channel 360 can be straight and the other of the third channel 355 and the fourth channel 360 can be curved. For example, the third channel 355 can be straight and the fourth channel 360 can be curved such that the fourth channel 360 curves around the third channel 355. The third channel 355 and the fourth channel 360 can extend through the apparatus 305. For example, the first face 320 and the second face 325 can each include at least one opening. An opening on the second face 325 can be connected to an opening on the first face 320 via the third channel 355. Additionally, another opening on the second face 325 can be connected to another opening on the first face 320 via the fourth channel 360. The third channel 355 and the fourth channel 360 can have fluid flow through them. For example, the fluid can be a coolant or a heated fluid. The third channel 355 can be coupled with the second opening 380 of the thermal component 215 via a connector. The third channel 355 can provide fluid to the second opening 380 of the thermal component 215. For example, the third channel 355 can provide coolant to the second opening 380 such that the coolant flows through the thermal component 215, as discussed more below. The fourth channel 360 can be coupled with the first opening 375 of the thermal component 215 via a connector. The fourth channel 360 can receive fluid from the first opening 375 of the thermal component 215. For example, the fourth channel 360 can receive coolant from the thermal component 215 via the first opening 375, as discussed in more detail below.

The third channel 355 and the fourth channel 360 can define the second position 405 of the apparatus 305. For example, the second position 405 can provide at least one second fluid flow direction 410 via the third channel 355 and the fourth channel 360. For example, fluid can travel in the second fluid flow direction 410 from the third channel 355 to and through the thermal component 215 and then through the fourth channel 360. The supply tube 345 can provide the fluid to third channel 355. The supply tube 345 and the third channel 355 can be coupled. For example, when the actuator 395 rotates the apparatus 305, the third channel 355 can be detached, or decoupled, from the supply tube 345. The receiver tube 350 can receive fluid from the fourth channel 360. The receiver tube 350 and the fourth channel 360 can be coupled. For example, when the actuator 395 rotates the apparatus 305, the fourth channel 360 can be detached, or decoupled, from the receiver tube 350.

The system 300 can include at least one connector. A connector can be a first connector tube 365. For example, the first connector tube 365 can connect the first channel 330 to the first opening 375 of the thermal component 215 with the apparatus 305 in the first position 310. The first opening 375 of the thermal component 215 can be an inlet with the apparatus 305 in the first position 310. For example, the first opening 375 can be an inlet to receive a heated liquid from the first connector tube 365 with the apparatus 305 in the first position 310. Additionally, the first connector tube 365 can connect the fourth channel 360 to the first opening 375 of the thermal component 215 with the apparatus 305 in the second position 405. The first opening 375 of the thermal component 215 can be an outlet with the apparatus 305 in the second position 405. For example, the first opening 375 can be an outlet to provide a heated liquid from the cooling line 210 to the first connector tube 365 with the apparatus 305 in the second position 405.

Another connector can be a second connector tube 370. For example, the second connector tube 370 can connect the second channel 335 to the second opening 380 of the thermal component 215 with the apparatus 305 in the first position 310. The second opening 380 of the thermal component 215 can be an outlet with the apparatus 305 in the first position 310. For example, the second opening 380 can be an outlet to provide a heated liquid from the cooling line 210 to the second connector tube 370 with the apparatus 305 in the first position 310. Additionally, the second connector tube 370 can connect the third channel 355 to the second opening 380 of the thermal component 215 with the apparatus 305 in the second position 405. The second opening 380 of the thermal component 215 can be an inlet with the apparatus 305 in the second position 405. For example, the second opening 380 can be an inlet to receive a heated liquid from the second connector tube 370 with the apparatus 305 in the second position 405.

The first opening 375 of the thermal component 215 and the second opening 380 of the thermal component 215 can be in communication via the cooling line 210 of the thermal component 215. For example, the fluid can flow into the first opening 375 and then through the cooling line 210 and then out of the second opening 380. Additionally, the fluid can flow into the second opening 380 and then through the cooling line 210 and then out of the first opening 375. The first connector tube 365 and the second connector tube 370 can be made of a flexible material, such as PVC tubing, or a hard material, such as steel.

The system 300 can include at least one socket. For example, the system 300 can include a first socket 385 and a second socket 390. The first connector tube 365 can be coupled with the first opening 375 of the thermal component 215. For example, the first socket 385 can couple the first connector tube 365 and the first opening 375 of the thermal component 215. Additionally, the first connector tube 365 and the first opening 375 can be welded together. Further, the first connector tube 365 and the first opening 375 can be coupled. The second connector tube 370 can be coupled with the second opening 380 of the thermal component 215. For example, the second socket 390 can connect the second connector tube 370 and the second opening 380 of the thermal component 215. Additionally, the second connector tube 370 and the second opening 380 can be welded together. Further, the second connector tube 370 and the second opening 380 can be coupled.

The first connector tube 365 and the first channel 330 can be coupled. For example, when the actuator 395 rotates the apparatus 305, the first channel 330 can be detached, or decoupled, from the first connector tube 365. The first connector tube 365 and the fourth channel 360 can be coupled. For example, when the actuator 395 rotates the apparatus 305, the fourth channel 360 can be detached, or decoupled, from the first connector tube 365. The second connector tube 370 and the second channel 335 can be coupled. For example, when the actuator 395 rotates the apparatus 305, the second channel 335 can be detached, or decoupled, from the second connector tube 370. The second connector tube 370 and the third channel 355 can be coupled. For example, when the actuator 395 rotates the apparatus 305, the third channel 355 can be detached, or decoupled, from the second connector tube 370.

The apparatus 305 can actuate from at least one position to at least one other position. For example, the actuator 395 can rotate the apparatus 305 from the first position 310 to another position such that the first channel 330 is decoupled from the supply tube 345 and the first connector tube 365, and the second channel 335 is decoupled from the receiver tube 350 and the second connector tube 370. Additionally, the actuator 395 can rotate the apparatus 305 from the second position 405 to another position such that the third channel 355 is decoupled from the supply tube 345 and the second connector tube 370, and the fourth channel 360 is decoupled from the receiver tube 350 and the first connector tube 365.

The apparatus 305 can actuate from the first position 310 to the second position 405 to reverse at least one flow direction in the thermal component 215 from the first fluid flow direction 340 to the second fluid flow direction 410. For example, the first fluid flow direction 340 can be opposite from the second fluid flow direction 410 in the cooling line 210 of the thermal component 215. Further, the apparatus 305 can actuate from the second position 405 to the first position 310 to reverse the flow direction in the thermal component 215 from the second fluid flow direction 410 to the first fluid flow direction 340. With the apparatus 305 in the first position 310, the fluid can flow in the first fluid flow direction 340. For example, the fluid can flow from the supply tube 345 through the first channel 330 and then through the first connector tube 365 and then through the cooling line 210 of the thermal component 215 and then through the second connector tube 370 and then through the second channel 335 and then to the receiver tube 350. With the apparatus 305 in the second position 405, the fluid can flow in the second fluid flow direction 410. For example, the fluid can flow from the supply tube 345 through the third channel 355 and then through the second connector tube 370 and then through the cooling line 210 of the thermal component 215 and then through the first connector tube 365 and then through the fourth channel 360 and then to the receiver tube 350.

Figure 5:
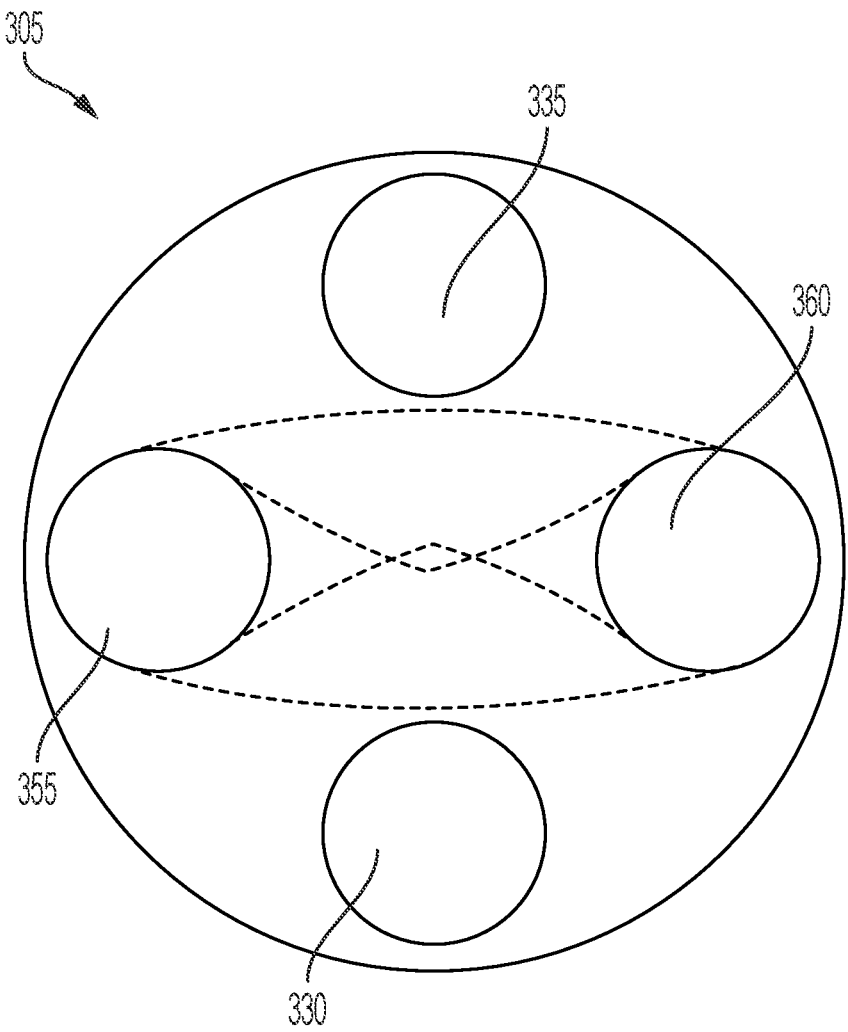
FIG. 5 depicts a side view of an apparatus in a first position, according to an exemplary embodiment.

FIG. 5 depicts a side view of the apparatus 305 in the first position 310. FIG. 5 depicts a face of the apparatus 305 in the first position 310. The face of the apparatus 305 in the first position 310 can be the first face 320 or the second face 325. For example, when the apparatus 305 is in the first position 310, the first face 320 and the second face 325 will look the same from a side view. The first position 310 is an example of the apparatus 305 at an at least one point in time. For example, the first position 310 can be at any point in the rotation of the apparatus 305.

Figure 6:
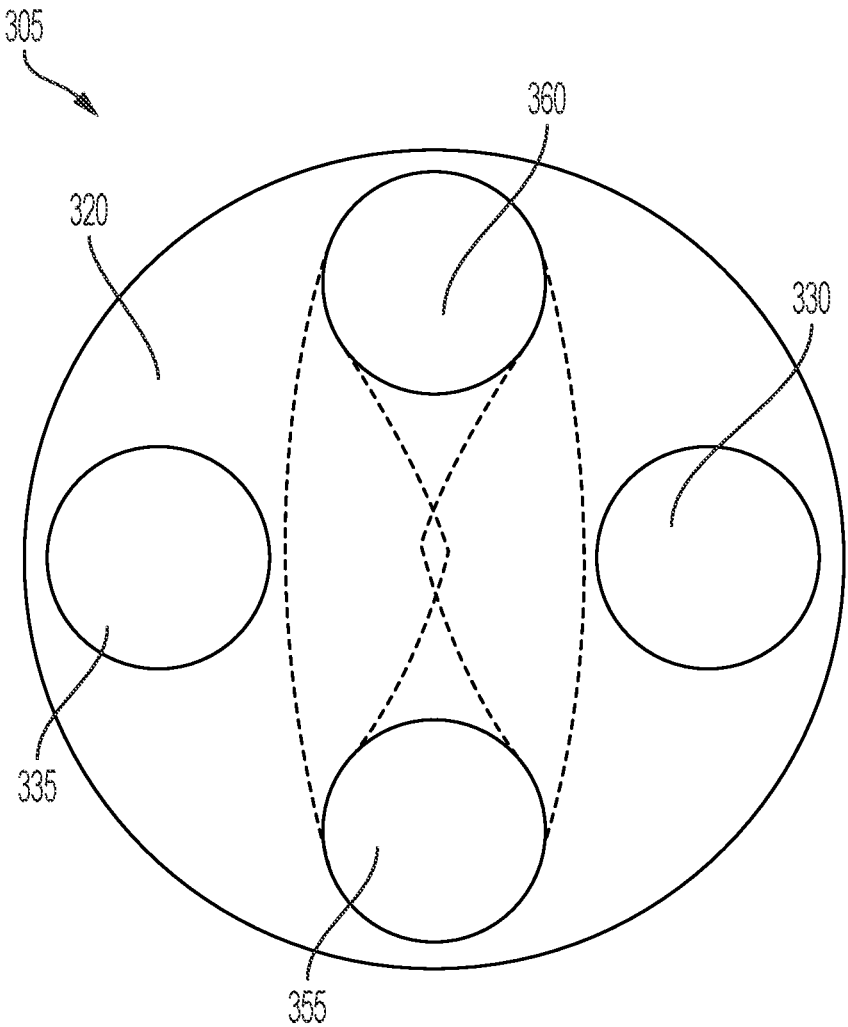
FIG. 6 depicts a side view of a first face of an apparatus in a second position, according to an exemplary embodiment.
Figure 7:
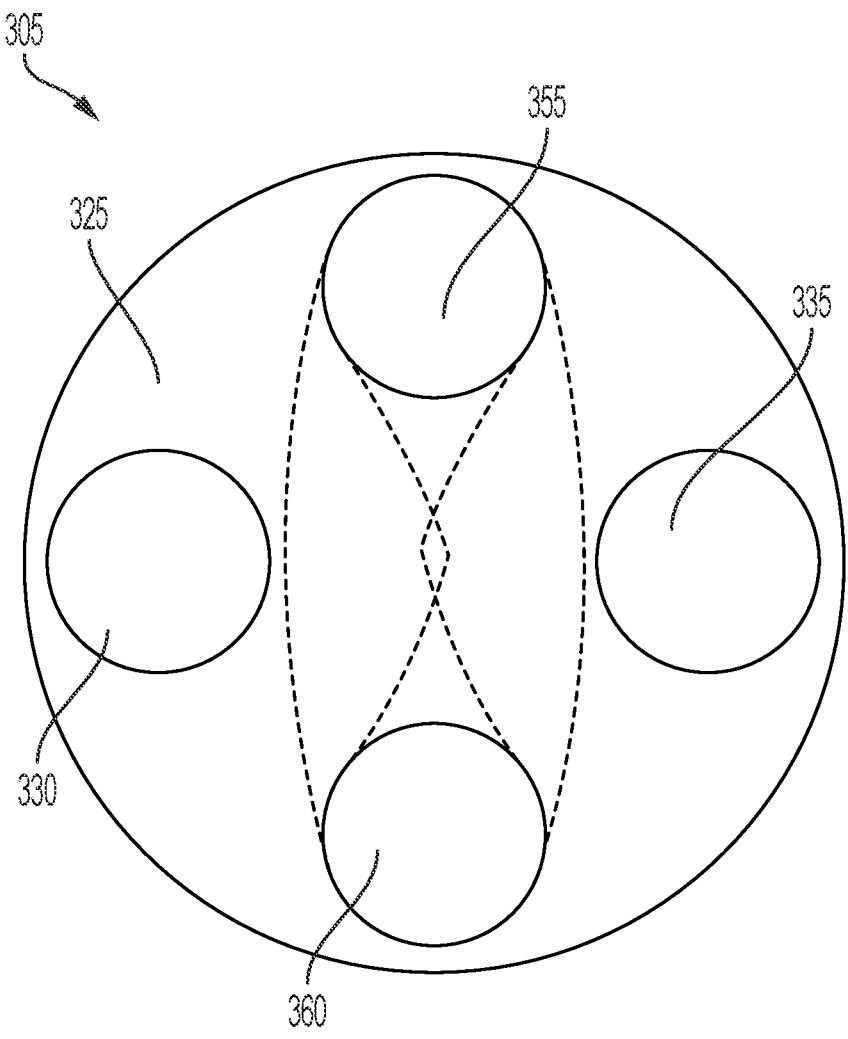
FIG. 7 depicts a side view of a second face of an apparatus in a second position, according to an exemplary embodiment.

FIG. 6 and FIG. 7 depict the apparatus 305 in the second position 405. FIG. 6 depicts a side view of the first face 320 of the apparatus 305 in the second position 405. FIG. 7 depicts a side view of the second face 325 of the apparatus 305 in the second position 405. The second position 405 is an example of the apparatus 305 at a point in time. For example, the second position 405 can be at any point in the rotation of the apparatus 305. For example, the second position 405 can be rotated 90 degrees clockwise from the first position 310.

The first face 320 and the second face 325 can each include four openings for different channels and the four openings on the first face 320 can correspond with the four openings on the second face 325. For example, one of the openings on the first face 320 and one of the openings on the second face 325 can correspond with each other as well as can correspond with one of the first channel 330, the second channel 335, the third channel 355, or the fourth channel 360. The arrangement of the four openings on the first face 320 can be the same as the arrangement of the four openings on the second face 325 with the apparatus 305 in the first position 310. For example, when the apparatus 305 is in the first position 310, the first face 320 and the second face 325 will look the same from a side view. The channels 355 and 360 can wrap around each other internally in the apparatus 305, as shown in FIGS. 5, 6, and 7. For example, the channels 355 and 360 can be fluidly isolated from each other and wrap around each other. The channels 330, 335, 355, and 360 can be positioned in any order on the first face 320 or on the second face 325. For example, the third channel 335 does not have to be directly above the first channel 330, as shown in FIG. 5, among others. For example, the third channel 335 can be on at least one side of the first channel 330 or below the first channel 330 or both, with the apparatus in the first position 310. The third channel 355 and the fourth channel 360 do not have to be on the side of each other, as shown in FIG. 5. For example, one of either the third channel 355 or the fourth channel 360 can be above or below the other, with the apparatus in the first position 310.

Figure 8:
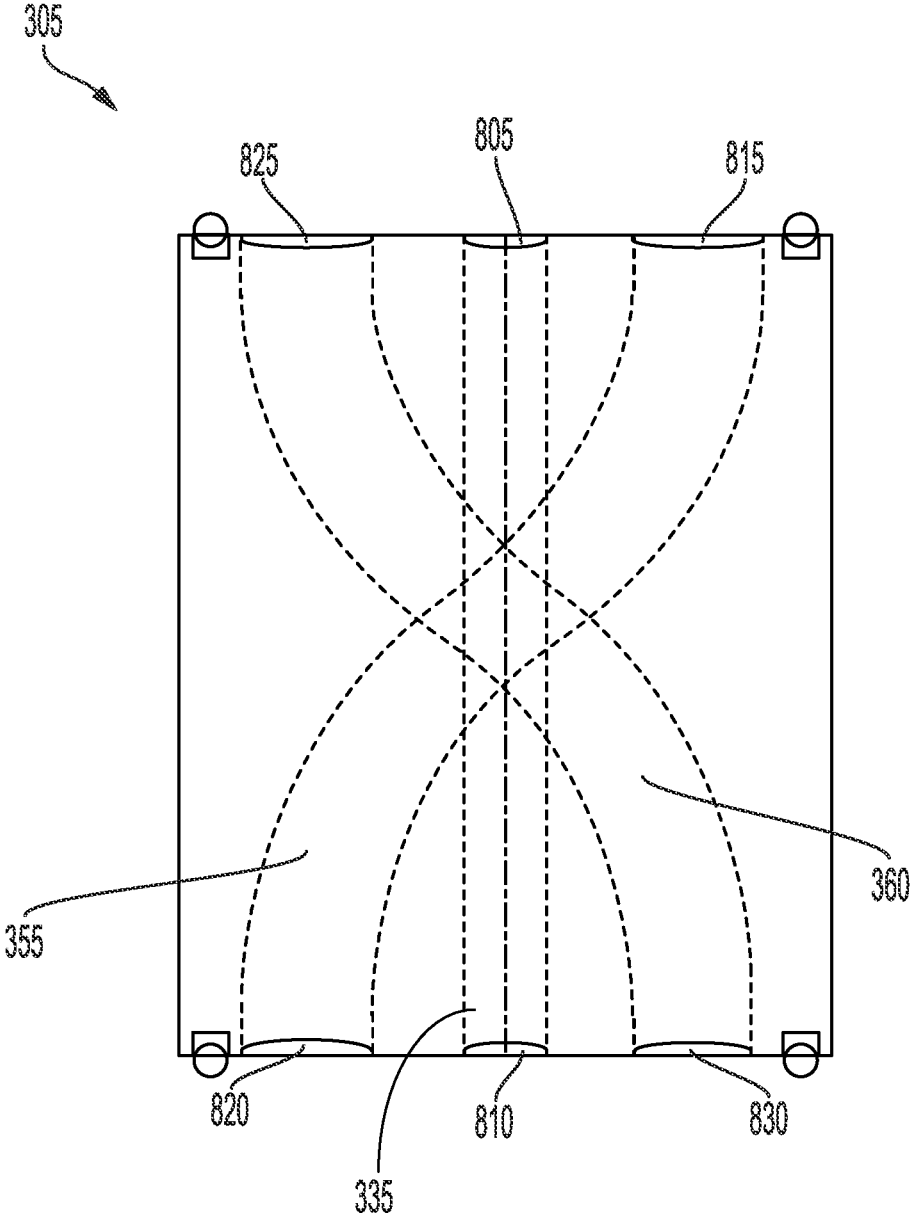
FIG. 8 depicts a top view of an apparatus in a first position, according to an exemplary embodiment.
Figure 9:
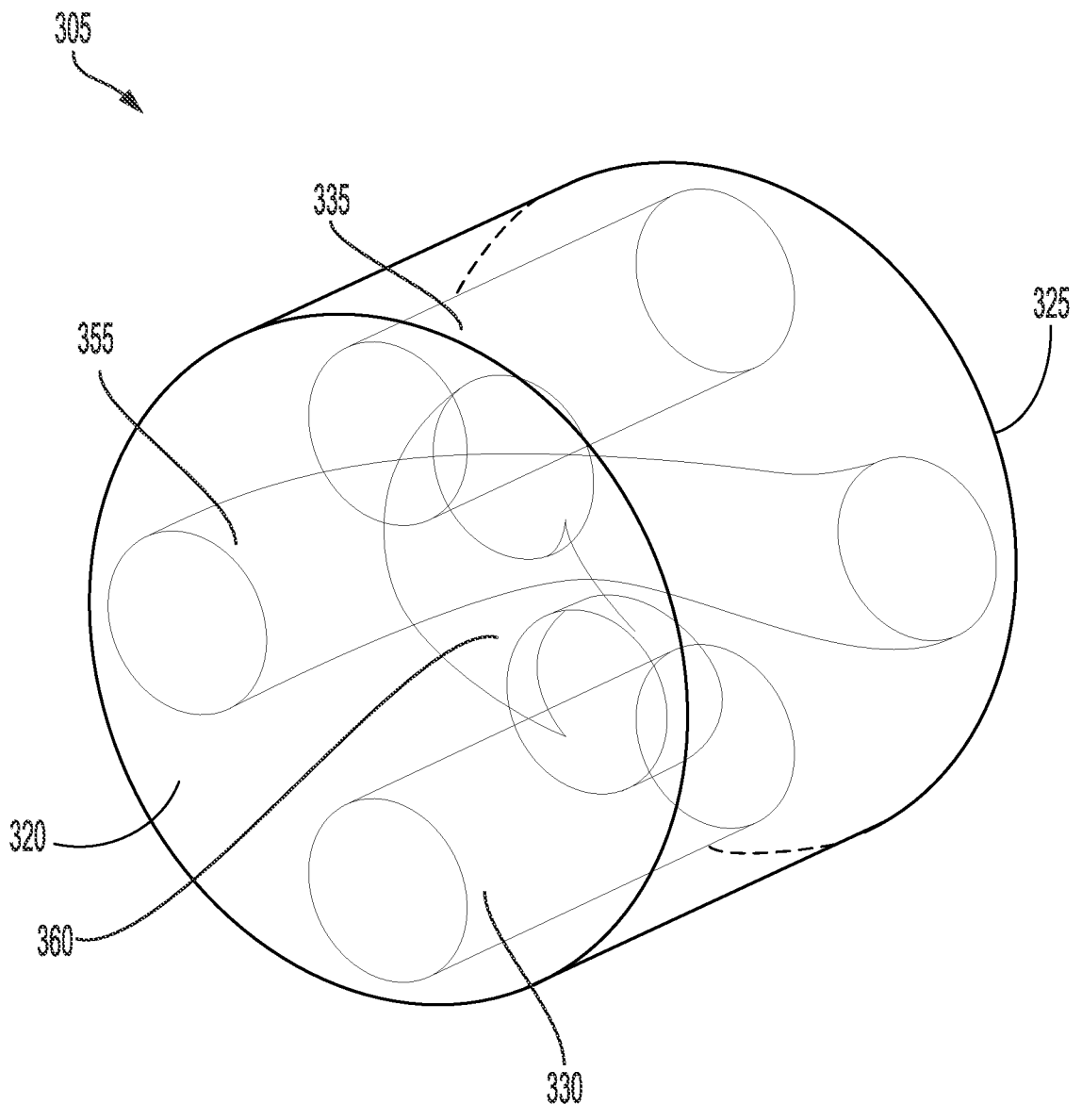
FIG. 9 depicts a perspective view of an apparatus in a first position, according to an exemplary embodiment.

FIG. 8 and FIG. 9 depict the apparatus 305 in the first position 310. FIG. 8 depicts a top view of the apparatus 305 in the first position 310. FIG. 9 depicts a perspective view of the apparatus 305 in the first position 310. The first channel 330 and the second channel 335 can extend through the apparatus 305 from the first face 320 to the second face 325. For example, the channels 330 and 335 can be straight and can extend directly through the apparatus 305. The third channel 355 and the fourth channel 360 can extend through the apparatus 305 from the first face 320 to the second face 325. For example, the channels 355 and 360 can be curved and can extend through the apparatus 305 in a curved path such that the channels 355 and 360 curve around each other. The first position 310 is an example of the apparatus 305 at an at least one point in time. For example, the first position 310 can be at any point in the rotation of the apparatus 305.

The system 300 can include at least one channel port seal member. For example, the first channel 330, the second channel 335, the third channel 355, and the fourth channel 360 can each include at least one channel port seal member that can be in contact with one of the connector tubes 365, 370. For example, the channels 330, 335, 355, 360 can each include at least one channel port seal member that can be in contact with one the supply tube 345 or receiver tube 350. The first channel 330 can include a first channel port seal member in contact with the supply tube 345 with the apparatus in the first position 310. The first channel 330 can include a second channel port seal member in contact with the first connector tube 365 with the apparatus in the first position 310. For example, the first channel 330 and the first connector tube 365 can be coupled via the second channel port seal member such that the fluid does not leak throughout the system 300. The second channel 335 can include a third channel port seal member 805 in contact with the receiver tube 350 with the apparatus in the first position 310. The second channel 335 can include a fourth channel port seal member 810 in contact with the second connector tube 370 with the apparatus in the first position 310. For example, the second channel 335 and the receiver tube 350 can be coupled via the third channel port seal member 805 such that the fluid does not leak throughout the system 300.

The third channel 355 can include a fifth channel port seal member 815 in contact with the supply tube 345 with the apparatus in the second position 405. The third channel 355 can include a sixth channel port seal member 820 in contact with the second connector tube 370 with the apparatus in the second position 405. For example, the third channel 355 and the supply tube 345 can be coupled via the fifth channel port seal member 815 such that the fluid does not leak throughout the system 300. The fourth channel 360 can include a seventh channel port seal member 825 in contact with the receiver tube 350 with the apparatus in the second position 405. The fourth channel 360 can include an eighth channel port seal member 830 in contact with the first connector tube 365 with the apparatus in the second position 405. For example, the s fourth channel 360 and the receiver tube 350 can be coupled via the seventh channel port seal member 825 such that the fluid does not leak throughout the system 300. The channel port seal members 805-830 can be any device that can seal the channels 330, 335, 355, 360 such that the fluid circulating throughout the system 300 does not leak. The channel port seal members 805-830 can enable the channels 330, 335, 355, 360 to detachably couple to either the supply tube 345, receiver tub 350, the first connector tube 365, or the second connector tube 370. For example, when the apparatus 305 rotates from the first position 310 to the second position 405 or from the second position 405 to the first position 310, the channels 330, 335, 355, 360 decouple.

Figure 10:
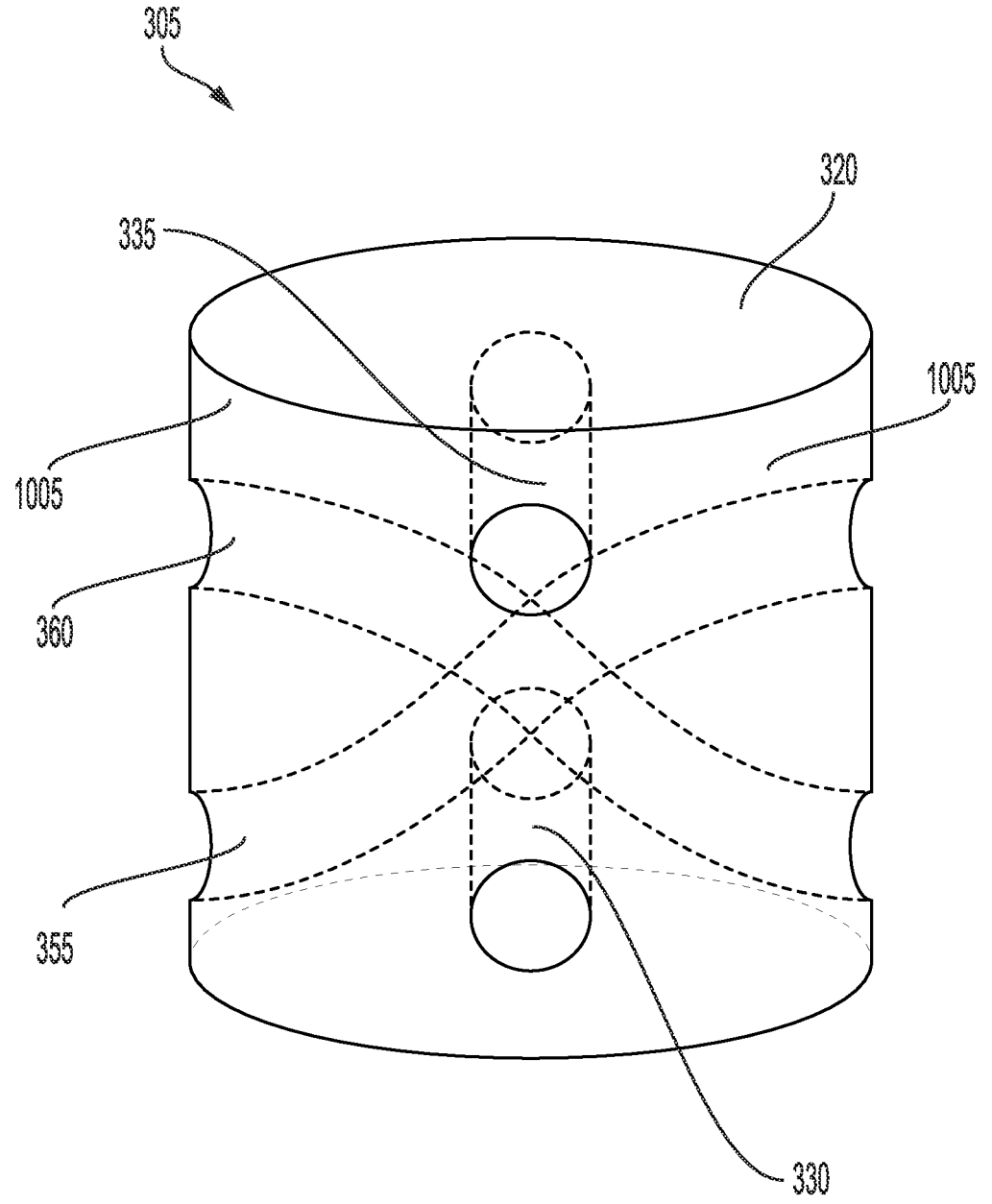
FIG. 10 depicts a perspective view of an example apparatus, according to an exemplary embodiment.

FIG. 10 depicts a perspective view of an example apparatus 305. For example, the channels 330, 335, 355, and 360 do not have to extend through the apparatus 305 from the first face 320 to the second face 325. The apparatus 305 can include a third face 1005. For example, the third face 1005 can be a curved or cylindrical surface. For example, the third face 1005 can be a lateral area of the apparatus 305. The third face 1005 can include openings for different channels. For example, the openings can be flow ports. For example, the channels 330, 335, 355, and 360 can each extend through the apparatus 305 from a portion of the third face 1005 to another portion of the third face 1005.

The channels 330 and 335 can connect with the components of the system 300 similarly as discussed above. For example, the first channel 330 can be coupled with the first opening 375 of the thermal component 215 via the first connector tube 365. The first channel 330 can provide fluid to the first opening 375 of the thermal component 215. For example, the first channel 330 can provide coolant to the first opening 375 such that the coolant flows through the thermal component 215. The second channel 335 can be coupled with the second opening 380 of the thermal component 215 via the second connector tube 370. The second channel 335 can receive fluid from the second opening 380 of the thermal component 215. For example, the second channel 335 can receive coolant from the thermal component 215 via the second opening 380. The supply tube 345 and the first channel 330 can be coupled. For example, when the actuator 395 rotates the apparatus 305, the first channel 330 can be detached, or decoupled, from the supply tube 345. The supply tube 345 can provide the fluid to the first channel 330. The receiver tube 350 and the second channel 335 can be coupled. For example, when the actuator 395 rotates the apparatus 305, the second channel 335 can be detached, or decoupled, from the receiver tube 350. The receiver tube 350 can receive fluid from the second channel 335.

The channels 355 and 360 can connect with the components of the system 300 similarly as discussed above. For example, the third channel 355 can be coupled with the second opening 380 of the thermal component 215 via the second connector tube 370. The third channel 355 can provide fluid to the second opening 380 of the thermal component 215. For example, the third channel 355 can provide coolant to the second opening 380 such that the coolant flows through the thermal component 215. The fourth channel 360 can be coupled with the first opening 375 of the thermal component 215 via the first connector tube 365. The fourth channel 360 can receive fluid from the first opening 375 of the thermal component 215. For example, the fourth channel 360 can receive coolant from the thermal component 215 via the first opening 375. The supply tube 345 and the third channel 355 can be coupled. For example, when the actuator 395 rotates the apparatus 305, the third channel 355 can be detached, or decoupled, from the supply tube 345. The receiver tube 350 can receive fluid from the fourth channel 360. The receiver tube 350 and the fourth channel 360 can be coupled. For example, when the actuator 395 rotates the apparatus 305, the fourth channel 360 can be detached, or decoupled, from the receiver tube 350.

Figure 11:
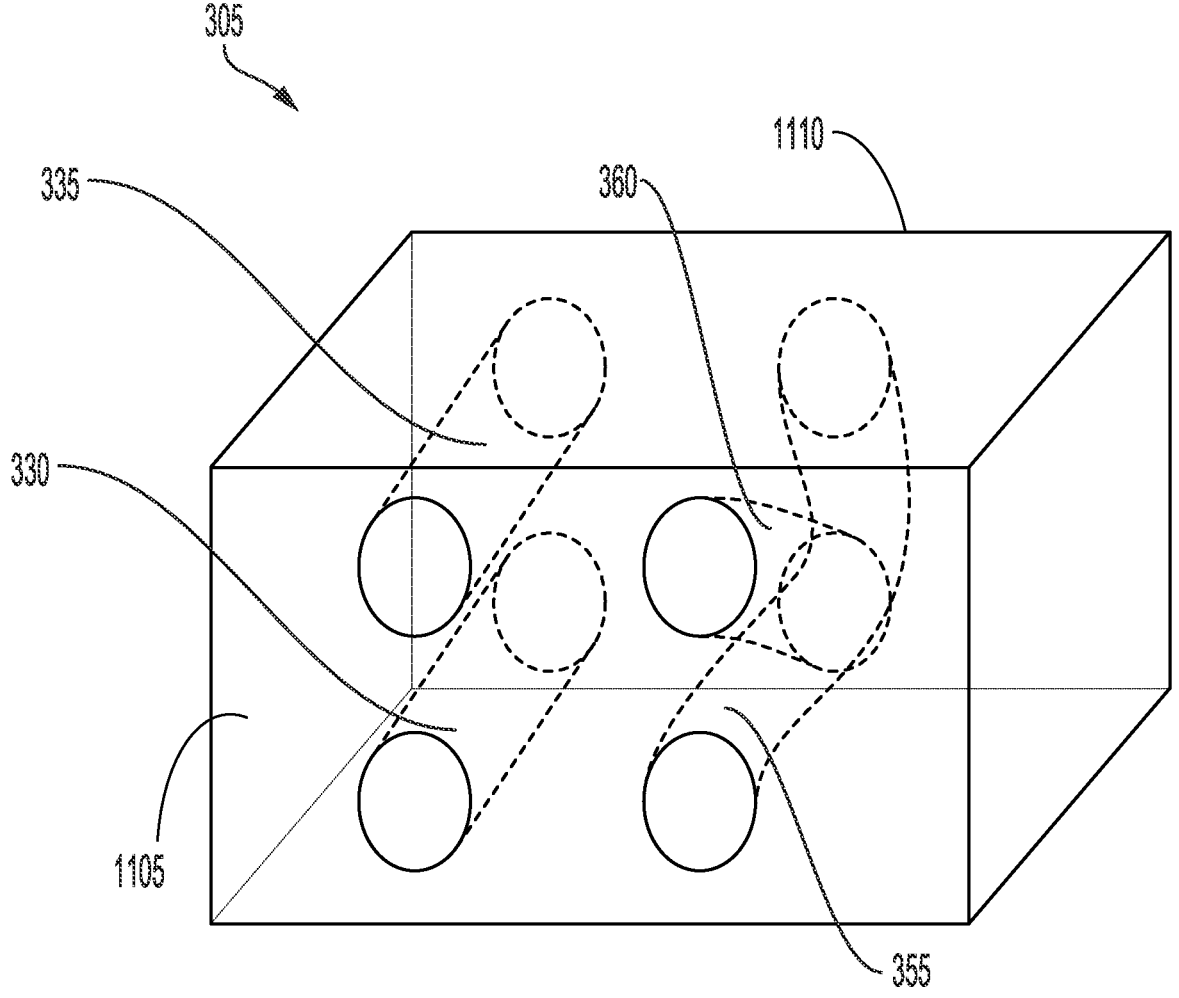
FIG. 11 depicts a perspective view of an example apparatus, according to an exemplary embodiment.

FIG. 11 depicts a perspective view of an example apparatus 305. For example, the actuator 395 does not have to rotate the apparatus 305. For example, the apparatus 305 can be a solenoid valve. The actuator 395 can translate the solenoid valve. For example, the actuator 395 can be a linear actuator. The apparatus 305 can include a plurality of surfaces. For example, the apparatus 305 can include a first surface 1105 and a second surface 1110. The first surface 1105 can include at least one opening for different channels. For example, the first surface 1105 can include four openings. One of each of the openings on the first surface 1105 can correspond with one of the channels 330, 335, 355, and 360. The second surface 1110 can include at least one opening for different channels. For example, the second surface 1110 can include four openings. One of each of the openings on the second surface 1110 can correspond with one of the channels 330, 335, 355, and 360. The channels 330, 335, 355, and 360 can each extend through the apparatus 305 from the first surface 1105 to the second surface 1110. For example, the first channel 330 and the second channel 335 can extend through the apparatus 305 from the first surface 1105 to the second surface 1110. For example, the channels 330 and 335 can be straight and can extend directly through the apparatus 305. The third channel 355 and the fourth channel 360 can extend through the apparatus 305 from the first surface 1105 to the second surface 1110. For example, the channels 355 and 360 can be curved and can extend through the apparatus 305 in a curved path such that the channels 355 and 360 curve around each other.

The channels 330 and 335 can connect with the components of the system 300 similarly as discussed above. For example, the first channel 330 can be coupled with the first opening 375 of the thermal component 215 via the first connector tube 365. The first channel 330 can provide fluid to the first opening 375 of the thermal component 215. For example, the first channel 330 can provide coolant to the first opening 375 such that the coolant flows through the thermal component 215. The second channel 335 can be coupled with the second opening 380 of the thermal component 215 via the second connector tube 370. The second channel 335 can receive fluid from the second opening 380 of the thermal component 215. For example, the second channel 335 can receive coolant from the thermal component 215 via the second opening 380. The supply tube 345 and the first channel 330 can be coupled. For example, when the actuator 395 translates the apparatus 305, the first channel 330 can be detached, or decoupled, from the supply tube 345. The supply tube 345 can provide the fluid to the first channel 330. The receiver tube 350 and the second channel 335 can be coupled. For example, when the actuator 395 translates the apparatus 305, the second channel 335 can be detached, or decoupled, from the receiver tube 350. The receiver tube 350 can receive fluid from the second channel 335.

The first channel 330 and second channel 335 can define the first position 310 of the apparatus 305. For example, the first position 310 can provide the first fluid flow direction 340 via the first channel 330 and the second channel 335. Fluid can travel in the first fluid flow direction 340 from the first channel 330 to and through the thermal component 215 and then through the second channel 335 from the thermal component 215.

The channels 355 and 360 can connect with the components of the system 300 similarly as discussed above. For example, the third channel 355 can be coupled with the second opening 380 of the thermal component 215 via the second connector tube 370. The third channel 355 can provide fluid to the second opening 380 of the thermal component 215. For example, the third channel 355 can provide coolant to the second opening 380 such that the coolant flows through the thermal component 215. The fourth channel 360 can be coupled with the first opening 375 of the thermal component 215 via the first connector tube 365. The fourth channel 360 can receive fluid from the first opening 375 of the thermal component 215. For example, the fourth channel 360 can receive coolant from the thermal component 215 via the first opening 375. The supply tube 345 and the third channel 355 can be coupled. For example, when the actuator 395 translates the apparatus 305, the third channel 355 can be detached, or decoupled, from the supply tube 345. The receiver tube 350 can receive fluid from the fourth channel 360. The receiver tube 350 and the fourth channel 360 can be coupled. For example, when the actuator 395 translates the apparatus 305, the fourth channel 360 can be detached, or decoupled, from the receiver tube 350.

The third channel 355 and the fourth channel 360 can define the second position 405 of the apparatus 305. For example, the second position 405 can provide the second fluid flow direction 410 via the third channel 355 and the fourth channel 360. For example, fluid can travel in the second fluid flow direction 410 from the third channel 355 to and through the thermal component 215 and then through the fourth channel 360.

Figure 12:
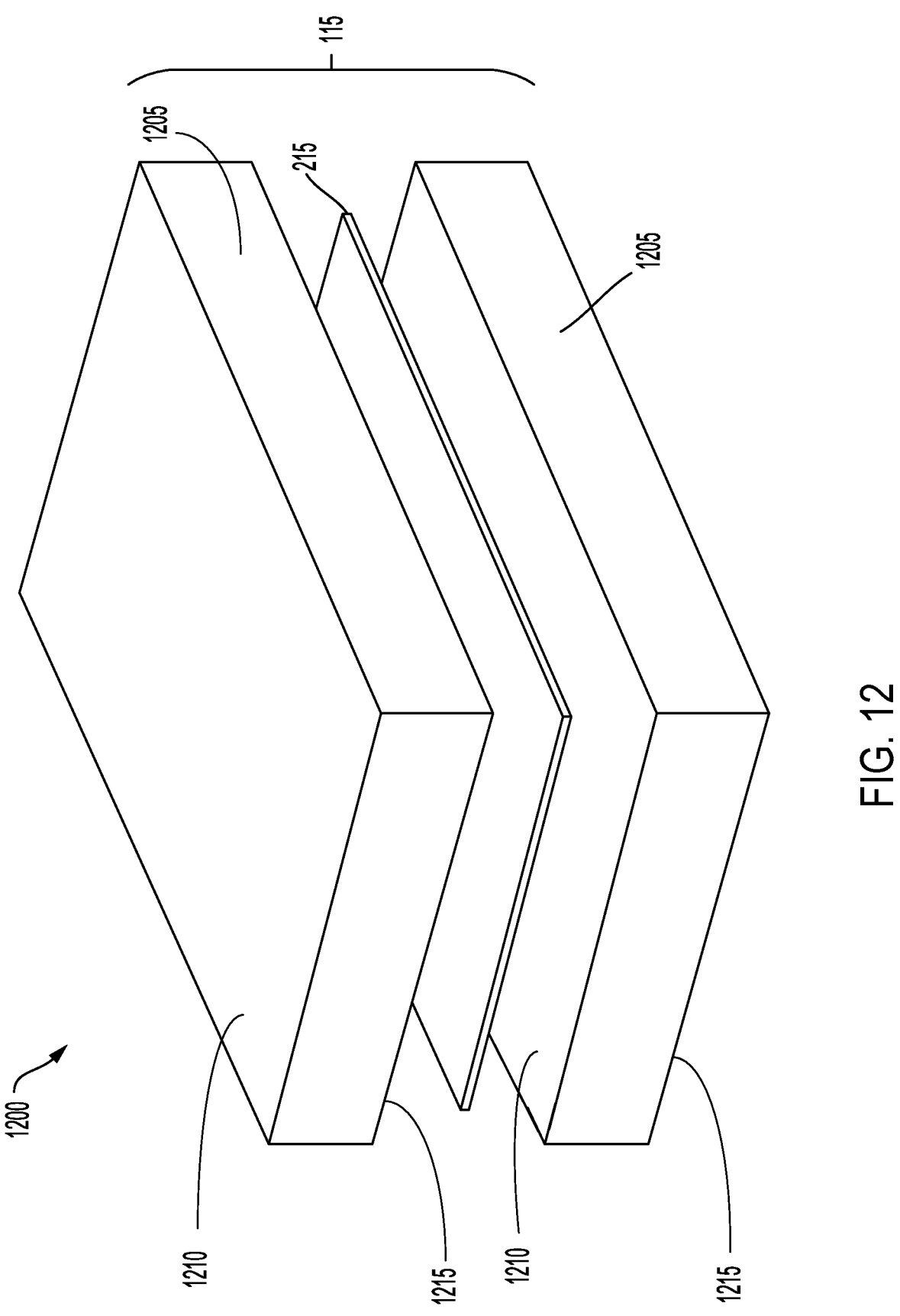
FIG. 12 depicts a perspective view of a battery module assembly, according to an exemplary embodiment.

FIG. 12 depicts example battery module assembly 1200. The battery module assembly 1200 can include at least one submodule 1205. The submodule 1205 can have a top surface 1210 and a bottom surface 1215. As explained above with reference to FIG. 2A, a battery pack 110 can include at least one thermal component 215. For example, as shown in FIG. 12 among others, a battery module 115 can include a thermal component 215. The thermal component 215 can be a cold plate. A battery pack 110 with a plurality of battery modules 115 can include a plurality of thermal components 215. The plurality of thermal components 215 can be hydraulically connected. For example, the plurality of thermal components 215 can be hydraulically connected either in series or in parallel, or a combination thereof. A battery pack 110 with a plurality of battery modules 115 can include a single thermal component 215 to provide thermal control for all the battery modules 115. The thermal component 215 can be a thin piece of material disposed between a first submodule 1205 and a second submodule 1205 of the battery module 115. For example, the thermal component 215 can be positioned between the top surface 1210 of the second submodule 1205 and the bottom surface 1215 of the first submodule 1205.

The actuator 395 can rotate the apparatus 305 at a threshold temperature of at least one submodule 1205. For example, the valve can actuate from the second position 405 to the first position 310 or from the first position 310 to the second position 405 at different threshold temperatures of the first submodule 1205. The threshold temperature can be a predetermined temperature. For example, the threshold temperature can be based off a temperature boundary of the at least one submodule 1205. The temperature boundary can range from 0 degrees Celsius to 15 degrees Celsius. For example, the threshold temperature can be based off the temperature boundary of the second submodule 1205 and be 5 degrees Celsius such that the valve can actuate from the second position 405 to the first position 310.

The first opening 375 of the thermal component 215 can be a first ingress point of the thermal component 215 with the apparatus 305 in the first position 310. The second opening 380 of the thermal component 215 can be a first egress point of the thermal component 215 with the apparatus 305 in the first position 310. For example, fluid can flow into the first ingress point, through the cooling line 210, and out of the first egress point, with the apparatus 305 in the first position 310. The second opening 380 of the thermal component 215 can be a second ingress point of the thermal component 215 with the apparatus 305 in the second position 405. The first opening 375 of the thermal component 215 can be a second egress point of the thermal component 215 with the apparatus 305 in the second position 405. For example, fluid can flow into the second ingress point, through the cooling line 210, and out of the second egress point, with the apparatus 305 in the second position 405.

The fluid in the cooling line 210 can have a first temperature at an ingress point of the thermal component 215 and a second temperature at an egress point of the thermal component 215. For example, the first temperature at the first ingress point can be different from the second temperature at the first egress point, with the apparatus 305 in the first position 310. For example, as the fluid travels through the cooling line 210, the temperature of the fluid can increase or decrease due to heat transfer. The temperatures throughout the thermal component 215 can adjust and correspond to the temperature gradient of the fluid in the cooling line 210, due to heat transfer. The temperatures throughout the submodules 1205 can adjust and correspond to the temperature gradient of the thermal component 215, due to heat transfer. For example, a portion of a submodule 1205 with a temperature less than the temperature of the corresponding portion of the thermal component 215 will increase in temperature until the two temperatures are equal. For example, a portion of a submodule 1205 with a temperature more than the temperature of the corresponding portion of the thermal component 215 will decrease in temperature until the two temperatures are equal.

The apparatus 305 can reverse the flow direction from a first fluid flow direction 340 to a second fluid flow direction 410. For example, the apparatus 305 can reverse the ingress point and egress point of the thermal component 215 such that the first ingress point becomes the second egress point and the first egress point becomes the second ingress point. Since the fluid at the first or second ingress point can be colder or hotter than the fluid at the first or second egress point, respectively, the portion of the submodule 1205 in contact with those corresponding portions of the thermal component 215 can also be colder or hotter. For example, the temperature of the fluid at the first ingress point can be lower than the temperature of the fluid at the first egress point such that the temperature of the portion of the submodule 1205 in contact with the portion of the thermal component 215 corresponding to the first ingress point is lower than that in contact with the portion of the thermal component 215 corresponding to the first egress point. Since the fluid flow direction can be reversed in the thermal component 215, the temperature of the submodules 1205 can be better controlled because the overall temperature gradient of the submodule can be better controlled. For example, there is not one ingress point that always receives hotter or colder fluid than one egress point. Instead, the thermal component 215 can have a first opening 375 and a second opening 380 that can each be an ingress point and an egress point, which results in increased control of the temperature of the submodules 1205. For example, the fluid can be directed to hot spots or cold spots of the submodules 1205 instead of having a single path.

Figure 13:
FIG. 13 depicts a flow diagram illustrating a method, according to an exemplary embodiment.
Figure 13:
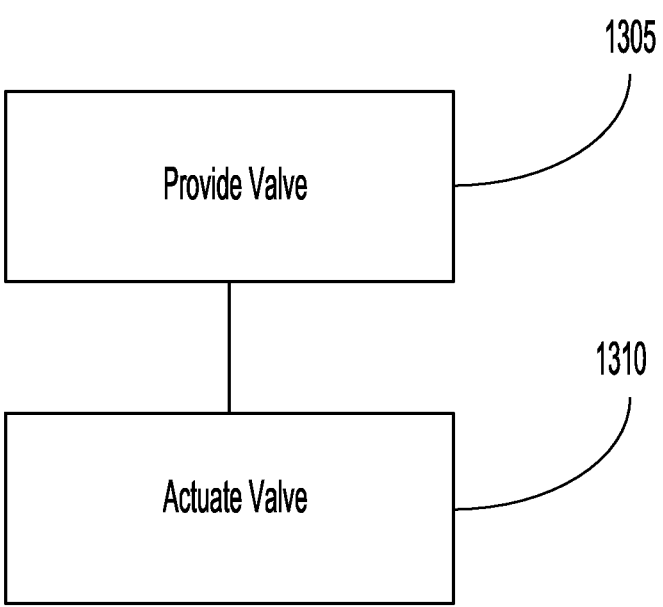

FIG. 13 depicts a flow diagram illustrating a method 1300. Method 1300 can be a method of reversing flow direction. Method 1300 can include providing a valve (Act 1305) and actuating the valve from a first position 310 to a second position 405 (Act 1310). The valve can include a first channel 330 and a second channel 335. The first channel 330 and the second channel 335 can define a first position 310 of the valve. The first channel 330 and the second channel 335 can provide a first fluid flow direction 340 with the valve in the first position 310. The valve can include a third channel 355 and a fourth channel 360. The third channel 355 and a fourth channel 360 can define a second position 405 of the valve. The third channel 355 and a fourth channel 360 can provide a second fluid flow direction 410 with the valve in the second position 405. Act 1310 of actuating the valve can include reversing flow direction from the first fluid flow direction 340 to the second fluid flow direction 410.

Figure 14:
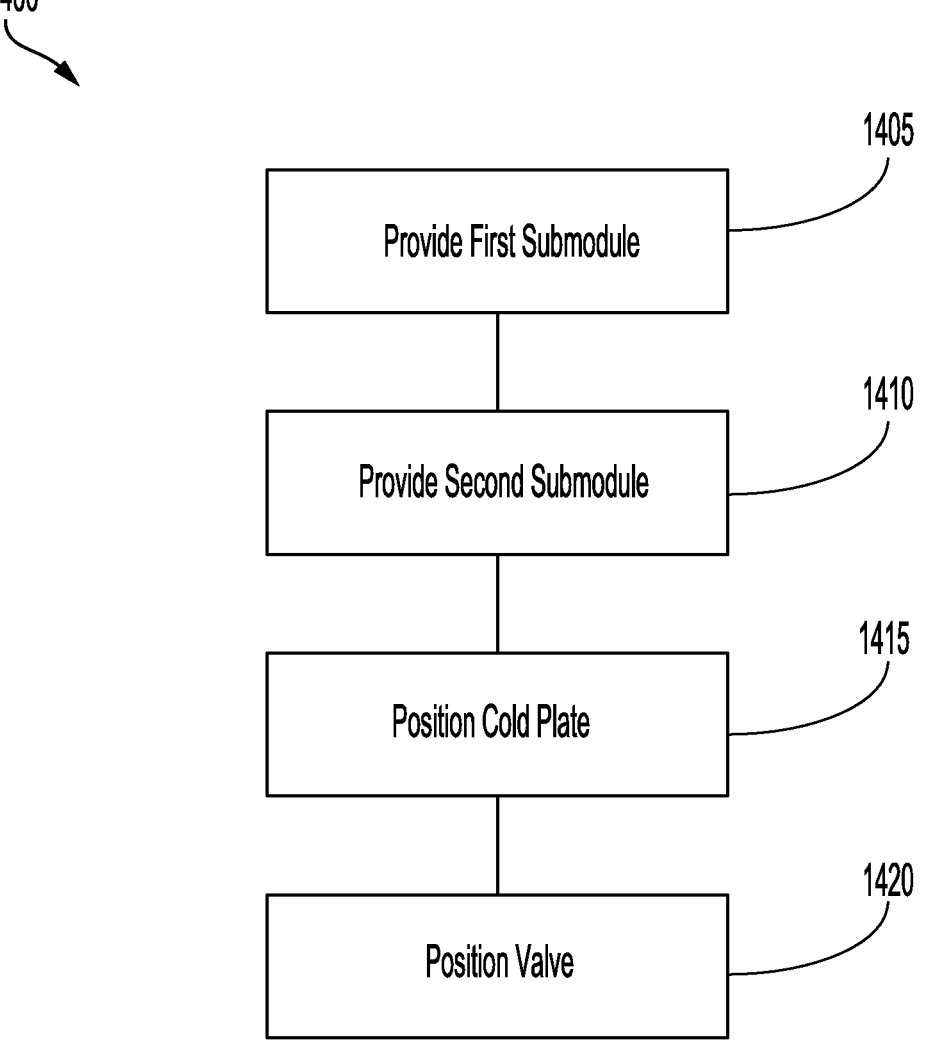
FIG. 14 depicts a flow diagram illustrating a method, according to an exemplary embodiment.

FIG. 14 depicts a flow diagram illustrating a method 1400. Method 1400 can include a method 1400 of thermally controlling the temperature of at least one submodule 1205. Method 1400 can include providing a first submodule 1205 (Act 1405) and providing a second submodule 1205 (Act 1410). The first submodule 1205 can have a bottom surface 1215. The second submodule 1205 can have a top surface 1210.

Method 1400 can include positioning a thermal component 215 between the first and second submodules 1205 (Act 1415). For example, Act 1415 can include positioning the thermal component 215 between the top surface 1210 of the second submodule 1205 and the bottom surface 1215 of the first submodule 1205. The thermal component 215 can include a cooling line 210. The thermal component 215 can define a first opening 375 and a second opening 3120, which can be connected by the cooling line 210. For example, a fluid can enter one of the first opening 375 and the second opening 380, travel through the cooling line 210, and exit the other of the one of the first opening 375 and the second opening 380. The average temperature of the thermal component 215 can increase or decrease as a result of and corresponding to the temperature of the fluid in the cooling line 210. For example, a fluid temperature less than the average temperature of the thermal component 215 can decrease the average temperature of the thermal component 215 as the fluid travels through the cooling line 210. The first and second submodules 1205 can be thermally controlled by the thermal component 215. For example, the average temperature of the first and second submodules 1205 can increase or decrease as a result of and corresponding to the temperature of the thermal component 215. For example, a thermal component 215 more than the average temperature of the first and second submodules 1205 can increase the average temperature of the first and second submodules 1205.

Method 1400 can include positioning a valve upstream of the thermal component 215 (Act 1420). For example, Act 1420 can include positioning a valve prior to a fluid ingress point of the thermal component 215. Act 1420 of positioning a valve upstream of the thermal component 215 can include actuating the valve from a first position 310 to a second position 405. The valve can include a first ingress channel 330. The first ingress channel 330 can be in communication with the first opening 375 of the thermal component 215 with the valve in the first position 310. For example, the first ingress channel 330 can provide fluid in a first fluid flow direction 340 to the first opening 375 of the thermal component 215. The valve can include a first egress channel 335. The first egress channel 335 can be in communication with the second opening 380 of the thermal component 215 with the valve in the first position 310. For example, the first egress channel 335 can receive fluid in the first fluid flow direction 340 from the second opening 380 of the thermal component 215. The valve can include a second ingress channel 355. The second ingress channel 355 can be in communication with the second opening 380 of the thermal component 215 with the valve in the second position 405. For example, the second ingress channel 355 can provide fluid in a second fluid flow direction 410 to the second opening 380 of the thermal component 215. The valve can include a second egress channel 360. The second egress channel 360 can be in communication with the first opening 375 of the thermal component 215 with the valve in the second position 405. For example, the second egress channel 360 can receive fluid in the second fluid flow direction 410 from the first opening 375 of the thermal component 215. The first fluid flow direction 340 in the cooling line 210 can be opposite from the second fluid flow direction 410 in the cooling line 210.

Figure 15:
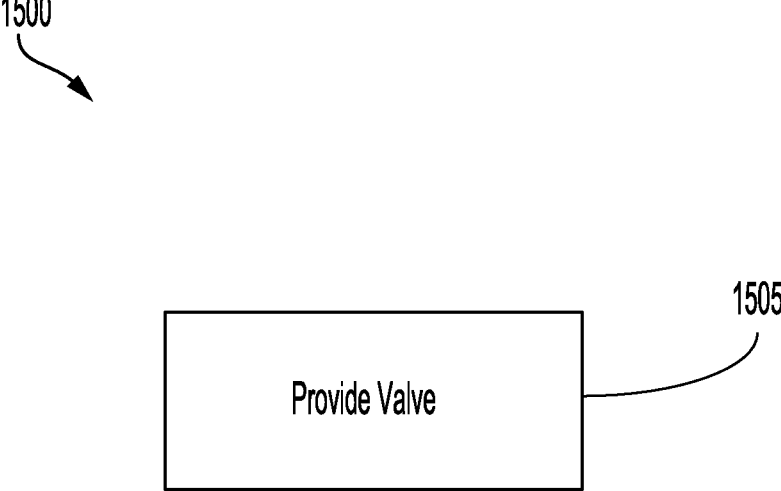
FIG. 15 depicts a flow diagram illustrating a method, according to an exemplary embodiment.

FIG. 15 depicts a flow diagram illustrating a method 1500. Method 1500 can be a method of reversing flow direction. Method 1500 can include providing a valve (Act 1505). The valve can include a first channel 330 and a second channel 335. The first channel 330 and the second channel 335 can define a first position 310 of the valve. The first channel 330 and the second channel 335 can provide a first fluid flow direction 340 with the valve in the first position 310. The valve can include a third channel 355 and a fourth channel 360. The third channel 355 and a fourth channel 360 can define a second position 405 of the valve. The third channel 355 and a fourth channel 360 can provide a second fluid flow direction 410 with the valve in the second position 405. The valve can actuate from the first position 310 to the second position 405 to reverse flow direction from the first fluid flow direction 340 to the second fluid flow direction 410.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
at least four separate channels having at least eight separate openings including:
a first channel having a first opening and a second opening and a second channel having a third opening and a fourth opening, the first channel and the second channel in a first position to provide a first fluid flow direction via the first channel and the second channel; and
a third channel having a fifth opening and a sixth opening and a fourth channel having a seventh opening and an eighth opening, the third channel and the fourth channel in a second position to provide a second fluid flow direction via the third channel and the fourth channel;
a first face having the first opening of the first channel, the third opening of the second channel, the fifth opening of the third channel, and the seventh opening of the fourth channel;
a second face separate from the first face, the second face having the second opening of the first channel, the fourth opening of the second channel, the sixth opening of the third channel, and the eighth opening of the fourth channel; and
the apparatus configured to actuate from the first position to the second position to reverse flow direction from the first fluid flow direction to the second fluid flow direction.

2. The apparatus of claim 1, wherein the first channel and third channel are ingress channels and wherein the second channel and fourth channel are egress channels.

3. The apparatus of claim 1, comprising:
the apparatus including a valve configured to actuate from the first position to the second position to reverse the flow direction in a thermal component from the first fluid flow direction to the second fluid flow direction.

4. The apparatus of claim 1, comprising:
the first channel and the fourth channel to couple with a first opening of a thermal component; and
the second channel and the third channel to couple with a second opening of the thermal component, the first opening of the thermal component and the second opening of the thermal component in communication via a cooling line defined by the thermal component.

5. The apparatus of claim 1, comprising:
the first channel configured to provide fluid to a first opening of a thermal component with the apparatus in the first position, the second channel configured to receive fluid from a second opening of the thermal component with the apparatus in the first position; and
the third channel configured to provide fluid to the second opening of the thermal component with the apparatus in the second position, and the fourth channel configured to receive fluid from the first opening of the thermal component with the apparatus in the second position.

6. The apparatus of claim 1, comprising:
the first channel and the fourth channel configured to couple with a first opening of a thermal component, the first opening of the thermal component configured as an inlet with the apparatus in the first position, and the first opening of the thermal component configured as an outlet with the apparatus in the second position; and
the second channel and the third channel configured to couple with a second opening of the thermal component, the second opening of the thermal component configured as an outlet with the apparatus in the first position, and the second opening of the thermal component configured as an inlet with the apparatus in the second position.

7. The apparatus of claim 1, comprising:
the first channel configured to provide fluid in the first fluid flow direction to a first opening of a thermal component with the apparatus in the first position;
the second channel configured to receive fluid in the first fluid flow direction from a second opening of the thermal component with the apparatus in the first position;
the third channel configured to provide fluid in the second fluid flow direction to the second opening of the thermal component with the apparatus in the second position;
the fourth channel configured to receive fluid in the second fluid flow direction from the first opening of the thermal component with the apparatus in the second position; and
the first opening and the second opening of the thermal component are in communication via a cooling line defined by the thermal component, the first fluid flow direction in the cooling line configured to be opposite the second fluid flow direction in the cooling line.

8. The apparatus of claim 1, comprising:
the apparatus including a valve to actuate from the first position to the second position at a threshold temperature of an at least one battery module.

9. The apparatus of claim 1, comprising:
the apparatus includes a valve to actuate from the second position to the first position at a threshold temperature of an at least one battery module.

10. The apparatus of claim 1, comprising:
the apparatus includes a valve to actuate from the first position to the second position via a motor and from the second position to the first position via the motor.

11. The apparatus of claim 1, comprising:
the first channel and the fourth channel configured to couple with a first opening of a thermal component via a first connector; and
the second channel and the third channel configured to couple with a second opening of the thermal component via a second connector.

12. The apparatus of claim 1, comprising:
the first channel and the fourth channel configured to couple with a first opening of a thermal component via a first connector; and
the second channel and the third channel configured to couple with a second opening of the thermal component via a second connector, the first channel, the second channel, the third channel, and the fourth channel each comprising channel port seal members in contact with the first connector and the second connector.

13. The apparatus of claim 1, comprising:
the first channel and the fourth channel configured to couple with a first connector tube; and
the second channel and the third channel configured to couple with a second connector tube.

14. The apparatus of claim 1, comprising:
the apparatus positioned between a heat exchanger and a thermal component, the heat exchanger configured to provide fluid to the first channel and the third channel, the first channel and the third channel configured to provide fluid to the thermal component, the thermal component configured to provide fluid to the second channel and the fourth channel.

15. A system, comprising:
a first submodule having a bottom surface;
a second submodule having a top surface;
a thermal component positioned between the top surface of the second submodule and the bottom surface of the first submodule, the thermal component having a cooling line, the thermal component defining a first opening and a second opening, the first opening and the second opening connected by the cooling line; and
a valve configured to actuate from a first position to a second position, the valve comprising at least four separate channels having at least eight separate openings including:
a first ingress channel having a first opening and a second opening, the first ingress channel in communication with the first opening of the thermal component with the valve in the first position;
a first egress channel having a third opening and a fourth opening, the first egress channel in communication with the second opening of the thermal component with the valve in the first position;
a second ingress channel having a fifth opening and a sixth opening, the second ingress channel in communication with the second opening of the thermal component with the valve in the second position;
a second egress channel having a seventh opening and an eighth opening, the second egress channel in communication with the first opening of the thermal component with the valve in the second position;
a first face having the first opening of the first ingress channel, the third opening of the first egress channel, the fifth opening of the second ingress channel, and the seventh opening of the second egress channel; and
a second face separate from the first face, the second face having the second opening of the first ingress channel, the fourth opening of the first egress channel, the sixth opening of the second ingress channel, and the eighth opening of the second egress channel.

16. The system of claim 15, comprising:
the first ingress channel configured to provide fluid in a first fluid flow direction to the first opening of the thermal component with the valve in the first position;
the first egress channel configured to receive fluid in the first fluid flow direction from the second opening of the thermal component with the valve in the first position;
the second ingress channel configured to provide fluid in a second fluid flow direction to the second opening of the thermal component with the valve in the second position;
the second egress channel configured to receive fluid in the second fluid flow direction from the first opening of the thermal component with the valve in the second position; and the first fluid flow direction in the cooling line of the thermal component is opposite of the second fluid flow direction in the cooling line of the thermal component.

17. The system of claim 15, comprising:

the valve configured to actuate from the first position to the second position at a first threshold temperature of an at least one battery module; and the valve configured to actuate from the second position to the first position at a second threshold temperature of the at least one battery module.

18. An electric vehicle, comprising:

a battery pack comprising:

a first submodule having a bottom surface;

a second submodule having a top surface; and a thermal component positioned between the top surface of the second submodule and the bottom surface of the first submodule, the thermal component having a cooling line, the thermal component defining a first opening and a second opening, the first opening of the thermal component and the second opening of the thermal component connected by the cooling line; and a valve configured to communicate with the thermal component, the valve comprising:

a first channel having a first opening and a second opening and a second channel having a third opening and a fourth opening, the first channel and the second channel in a first position to provide a first fluid flow direction;

a third channel having a fifth opening and a sixth opening and a fourth channel having a seventh opening and an eighth opening, the third channel and the fourth channel in a second position to provide a second fluid flow direction;

a first face having the first opening of the first channel, the third opening of the second channel, the fifth opening of the third channel, and the seventh opening of the fourth channel;

a second face separate from the first face, the second face having the second opening of the first channel, the fourth opening of the second channel, the sixth opening of the third channel, and the eighth opening of the fourth channel; and the valve configured to actuate from the first position to the second position to reverse flow direction from the first fluid flow direction to the second fluid flow direction.

19. The electric vehicle of claim 18, comprising:

the first channel configured to provide fluid in a first fluid flow direction to the first opening of the thermal component with the valve in the first position and the second channel configured to receive fluid in the first fluid flow direction from the second opening of the thermal component with the valve in the first position;

the third channel configured to provide fluid in a second fluid flow direction to the second opening of the thermal component with the valve in the second position and the fourth channel configured to receive fluid in the second fluid flow direction from the first opening of the thermal component with the valve in the second position; and the first fluid flow direction in the cooling line of the thermal component is opposite of the second fluid flow direction in the cooling line of the thermal component.

20. The electric vehicle of claim 18, comprising:

the valve configured to actuate from the first position to the second position at a first threshold temperature of an at least one battery module; and the valve configured to actuate from the second position to the first position at a second threshold temperature of the at least one battery module.

* * * * *